(12) United States Patent
Matsuura et al.

(10) Patent No.: US 7,230,996 B2
(45) Date of Patent: Jun. 12, 2007

(54) TRANSMITTING CIRCUIT DEVICE AND WIRELESS COMMUNICATIONS DEVICE

(75) Inventors: Toru Matsuura, Osaka (JP); Hisashi Adachi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 819 days.

(21) Appl. No.: 10/459,684

(22) Filed: Jun. 11, 2003

(65) Prior Publication Data

US 2004/0038648 A1 Feb. 26, 2004

(30) Foreign Application Priority Data

Jun. 13, 2002 (JP) ............... 2002-173354

(51) Int. Cl.
*H04K 1/02* (2006.01)
*H04L 25/03* (2006.01)
*H04L 25/49* (2006.01)

(52) U.S. Cl. .............. 375/296; 375/285; 327/551

(58) Field of Classification Search ........ 375/296, 375/285, 259, 295; 341/143; 327/551; 455/130
See application file for complete search history.

(56) References Cited

U.S. PATENT DOCUMENTS 5,854,599 A * 12/1998 Heo et al. ............... 341/143
7,057,449 B1 * 6/2006 Liu ........................ 327/551
2002/0173282 A1 * 11/2002 Panasik et al. ........... 455/130

FOREIGN PATENT DOCUMENTS

| EP | 0 726 656 A1 | 8/1996 |
| EP | 0 874 326 A2 | 10/1998 |
| JP | 2000-57732 | 2/2002 |
| JP | 2002-325109 | 11/2002 |

OTHER PUBLICATIONS

European Search Report for EP 03 01 3265, dated Sep. 22, 2005.

* cited by examiner

*Primary Examiner*—Phuong Phu
(74) *Attorney, Agent, or Firm*—RatnerPrestia

(57) ABSTRACT

A transmitting circuit device has a first signal source which outputs a first signal that is a binary or multilevel discrete analog signal or a discrete analog signal with a binary or multilevel envelope and that has signal components and quantization noise components; a second signal source which outputs a second signal composed of the quantization noise components; a first amplifier which amplifies the first signal; and a combiner which cancels out the quantization noise components by combining an output of the first amplifier and the second signal.

22 Claims, 28 Drawing Sheets

FROM AMPLITUDE DATA PATH

POWER AMPLIFIER

WHEN MIXER IS USED AS MULTIPLIER

FROM AMPLITUDE DATA PATH

HIGH-POWER AMPLITUDE MODULATOR
(MULTIPLIER)

IMPLEMENTED BY CONTROLLING SUPPLY
VOLTAGE OF POWER AMPLIFIER.

Fig. 29 (a) PRIOR ART
OUTPUT SIGNAL OF FREQUENCY MODULATOR
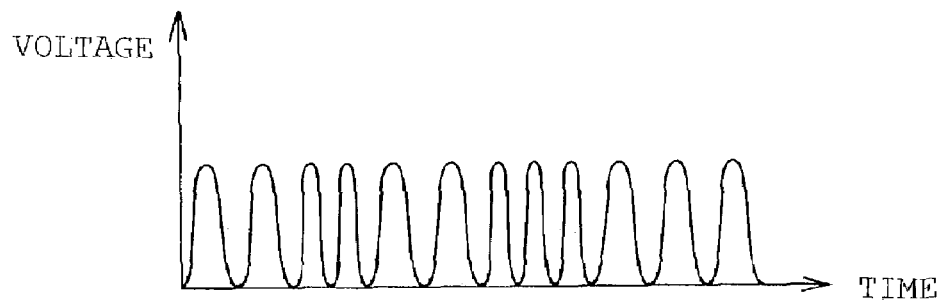
Fig. 29 (b) PRIOR ART
FREQUENCY MODULATION DATA
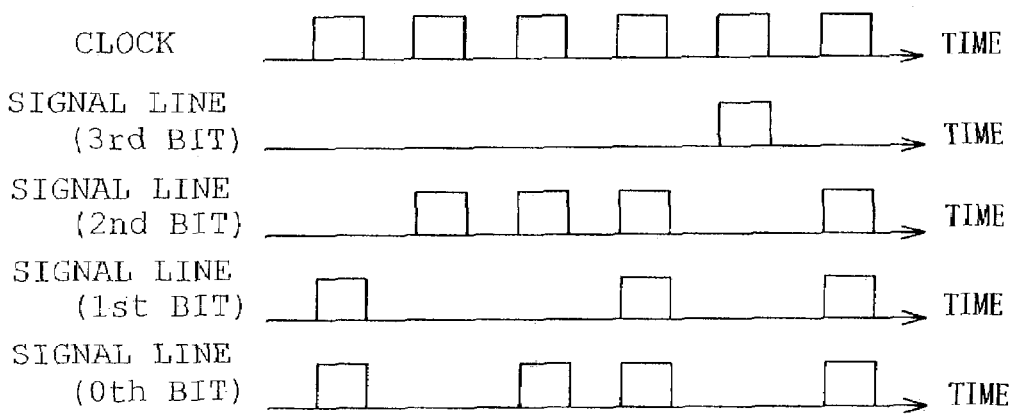
Fig. 29 (c) PRIOR ART
OUTPUT SIGNAL OF DELTA SIGMA MODULATOR
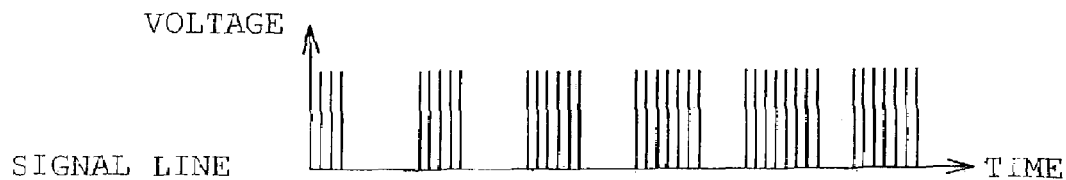

TRANSMITTING CIRCUIT DEVICE AND WIRELESS COMMUNICATIONS DEVICE

BACKGROUND OF THE INVENTION

1. Field of the Invention

The present invention relates to a transmitting circuit device used for a transmitting circuit of a wireless communications device as well as to a wireless communications device using it.

2. Related Art of the Invention

Recently, with the spread of cellular phones, cellular phone terminals have grown in functionality. For example, via a basestation, cellular phone terminals can now communicate wirelessly with a remote cellular phone terminal in a higher-quality voice, send and receive e-mail, and download images and programs through the Internet. In addition to growth in functionality, cellular phone terminals have been achieving reductions in size and power consumption.

One factor which has enabled growth in the functionality of cellular phone terminals is the adoption of digital wireless communications methods, such as CDMA, which allow larger amounts of information to be carried without error than do conventional analog wireless communications methods. These wireless communications methods employ QPSK or other similar modulation method and generally use a quadrature modulator as a component of a transmitting circuit device.

FIG. 26 shows a basic configuration of a conventional transmitting circuit device. In the figure, the transmitting circuit device consists of a quadrature modulator 403, bandpass filter 404, IQ signal generator 405, local oscillator 406, and power amplifier 411. The quadrature modulator 403 consists of a phase shifter 407, mixer 408, mixer 409, and combiner 410.

The IQ signal generator 405 outputs a baseband I signal and baseband Q signal—analog signals—which are input in the quadrature modulator 403. The local oscillator 406 outputs a carrier-frequency sine wave signal, which is then divided by the phase shifter 407 into two signals 90 degrees out of phase with each other. The resulting signals are input in the mixer 408 and mixer 409, which then use the baseband I signal and baseband Q signal, respectively, to amplitude-modulate the carrier-frequency signals 90 degrees out of phase with each other. The modulated signals are combined by the combiner 410 as an output of the quadrature modulator 403. The output of the quadrature modulator 403 is amplified by the power amplifier 411 and has unnecessary frequency components reduced by the bandpass filter 404 before it is output.

However, with the conventional transmitting circuit device, since the baseband I signal and baseband Q signal inputted in the quadrature modulator 403 are analog signals, it is necessary to prevent the mixers 408 and 409 from causing distortion. Thus, it is difficult to ensure a sufficiently high level of output from the quadrature modulator 403.

To raise the output of the quadrature modulator 403 to a sufficiently high level, it must be amplified by the power amplifier 411. Since the power amplifier 411 must be operated in a linear region relatively free of distortion, it must operate at a sufficiently low level compared to its saturation level. This causes the power amplifier 411 to consume much power, making it impossible to reduce power consumption of the transmitting circuit device as a whole.

To solve this conventional problem, applicants proposed a transmitting circuit device shown in FIG. 27 in Japanese Patent Laid-Open No. 2002-57732.

The disclosure of Japanese Patent Laid-Open No. 2002-57732 is incorporated herein by reference in its entirety.

FIG. 27 shows a basic configuration of the transmitting circuit device proposed by this applicant in his first patent application. In the figure, the transmitting circuit device consists of a first digital modulator 1001, second digital modulator 1002, quadrature modulator 1003, IQ data generator 1005, and local oscillator 1006.

Moreover, the quadrature modulator 1003 consists of a phase shifter 1007, first digital RF modulator 1008, second digital RF modulator 1009, first bandpass filter 1110, second bandpass filter 1111, and combiner 1010.

Next, operation of this transmitting circuit device will be described.

First, the IQ data generator 1005 outputs a baseband I signal to the first digital modulator 1001, and a baseband Q signal to the second digital modulator 1002. The baseband I signal and baseband Q signal are multilevel digital signals. The first digital modulator 1001 delta-sigma modulates an input signal and outputs a digital I signal which has a lower vertical resolution, i.e., a smaller number of available values than a baseband modulating signal. Similarly, the second digital modulator 1002 delta-sigma modulates an input signal and outputs a digital Q signal.

A local signal outputted by the local oscillator 1006 is divided by the phase shifter 1007 into carrier-frequency signals 90 degrees out of phase with each other. The two carrier-frequency signals are input in the first digital RF modulator 1008 and second digital RF modulator 1009, respectively. The carrier-frequency signal inputted in the first digital RF modulator 1008 is amplitude-modulated stepwise by an output signal from the first digital modulator 1001 while the carrier-frequency signal 90 degrees out of phase inputted in the second digital RF modulator 1009 is amplitude-modulated stepwise by an output signal from the second digital modulator 1002.

Output from the first digital RF modulator 1008 is input in the combiner 1010 through the first bandpass filter 1110 while output from the second digital RF modulator 1009 is input in the combiner 1010 through the second bandpass filter 1111. These inputs are added by the combiner 1010 to produce a transmitter output signal of the quadrature modulator 1003. The first bandpass filter 1110 and second bandpass filter 1111 are installed to reduce unnecessary frequency components which occur in outputs of the first digital RF modulator 1008 and second digital RF modulator 1009, respectively. In the configuration shown in FIG. 27, the bandpass filters 1110 and 1111 can reduce unnecessary frequency components before combining signals.

Since a digital RF modulator needs to output only those levels which exactly correspond to digital IQ signals which have a lower vertical resolution, i.e., a smaller number of available values, it does not need to have high linearity. Thus, elements included in the digital RF modulator can be used at levels close to their saturation levels, resulting in high efficiency. Also, since there are a small number of components dependent on analog characteristics, it is easy to ensure linearity.

Thus, the transmitting circuit device proposed by this applicant in his first patent application solves the above problem and offers great advantages: namely, by delta-sigma modulating the baseband IQ signals into digital IQ signals which has a lower vertical resolution, i.e., a smaller number of available values than the baseband IQ signals and modulating the carrier waves with the quadrature modulator, it can achieve good linearity and low power consumption.

FIG. 28 shows a basic configuration of a transmitting circuit device proposed by this applicant in Japanese Patent Laid-Open No. 2002-325109.

The disclosure of Japanese Patent Laid-Open No. 2002-325109 is incorporated herein by reference in its entirety.

The transmitting circuit device consists of a frequency modulator 1101, amplitude modulator 1102, delta sigma modulator 1103, bandpass filter 1104, and data generator 1105.

The data generator 1105 serves as a means of dividing an incoming digital signal and outputting vector modulation data composed of frequency modulation data and amplitude modulation data, both of which are digital signals that take discrete values.

The frequency modulator 1101 serves as a means of frequency-modulating a carrier-frequency signal using frequency modulation data.

The delta sigma modulator 1103 is a high-order delta sigma modulator and serves as a means of delta-sigma modulating amplitude modulation data and outputting digital amplitude data which has a lower vertical resolution, i.e., a smaller number of available values than the amplitude modulation data.

The amplitude modulator 1102 serves as a means of amplitude-modulating an output signal of the frequency modulator 1101 using the digital amplitude data outputted from the delta sigma modulator 1103.

The bandpass filter 1104 serves as a means of reducing unnecessary frequency components in the amplitude modulator 1102. Whereas the transmitting circuit device shown in FIG. 26 which employs a conventional quadrature modulator needs two bandpass filters, the transmitting circuit device in FIG. 28 needs only one bandpass filter. In this way, the transmitting circuit device in FIG. 28 needs a smaller number of bandpass filters than do conventional transmitting circuit devices.

Next, operation of this transmitting circuit device will be described.

The data generator 1105 generates vector modulation data by dividing an incoming digital signal. Specifically, as the vector modulation data, it generates and outputs frequency modulation data and amplitude modulation data, both of which are digital signals.

The frequency modulator 1101 frequency-modulates a carrier-frequency signal using the frequency modulation data outputted from the data generator 1105. FIG. 29(a) shows a signal which has been frequency-modulated by the frequency modulator 1101. It can be seen that the frequency-modulated signal has a constant envelope.

The delta sigma modulator 1103 is a high-order delta sigma modulator. It delta-sigma modulates amplitude modulation data and outputs digital amplitude data which has a lower vertical resolution, i.e., a smaller number of available values than the amplitude modulation data.

FIG. 29(b) shows amplitude modulation data which is input in the delta sigma modulator 1103. The amplitude modulation data is transmitted to the delta sigma modulator 1103 via a bus line on which data bits are transmitted on respective signal lines in synchronization with a clock signal. FIG. 29(c) shows output data from the delta sigma modulator 1103. In FIG. 29(c), the output data from the delta sigma modulator 1103 is modulated into binary digital amplitude data. Although the amplitude modulation data has been described as data transmitted via a bus line as shown in FIG. 29(b), it may alternatively be transmitted as a multilevel analog signal which takes discrete values.

The amplitude modulator 1102 amplitude-modulates the output signal of the frequency modulator 1101 using digital amplitude data.

Output of the amplitude modulator 1102 has unnecessary frequency components reduced by the bandpass filter 1104.

The output of the frequency modulator 1101 is a frequency-modulated signal and thus, has a constant envelope. The amplitude modulator 1102, which performs amplitude modulation using digital amplitude data, needs to provide only a small number of output levels proportional to the numeric values of the data because the digital amplitude data has a low vertical resolution, i.e., a smaller number of available values. Thus, even an amplitude modulator with low linearity can readily correct output levels.

If the delta sigma modulator 1103 is configured to produce 1-bit outputs, in particular, the amplitude modulator needs to operate simply as a switch. This allows the amplitude modulator 1102 to operate nearly at its saturation level, resulting in high efficiency. Also, since there are a small number of components dependent on analog characteristics, it is possible to obtain good linearity even using elements prone to produce high distortion.

Thus, the transmitting circuit device proposed by this applicant solves the above problem and offers great advantages: namely, it can achieve good linearity, high transmitter output power efficiency, and low power consumption.

Although the frequency modulator 1101 is used in the example described above, this is not restrictive. Instead of the frequency modulator 1101, the transmitting circuit device proposed by this applicant can also use a phase modulator which phase-modulates carrier-frequency signals using the phase modulation data outputted from the data generator 1105. In short, the transmitting circuit device described above can produce the same effect using a frequency modulator or angle modulator such as a phase modulator.

FIG. 30 shows a transmitting circuit device proposed in order to solve the conventional problem described above. This transmitting circuit device amplifies discrete analog signals unlike the transmitting circuit device shown in FIG. 26. It consists of a delta sigma modulator 1202, amplifier 1203, and bandpass filter 1204.

The delta sigma modulator 1202 delta-sigma modulates input data received via an input terminal 1201 and outputs digital data which has a lower vertical resolution, i.e., a smaller number of available values than the input data.

The digital data outputted from the delta sigma modulator 1202 goes through D/A conversion, is amplified by the amplifier 1203, passes through the bandpass filter 1204 to reduce unnecessary frequency components including quantization noise produced when the input data is quantized by the delta sigma modulator 1202, and is output through an output terminal 1205.

Since the delta sigma modulator 1202 converts the input data into digital data which has a lower vertical resolution, i.e., a smaller number of available values, the amplifier 1203 needs to output only those levels which exactly correspond to the digital data which has a lower vertical resolution, i.e., a smaller number of available values and does not need to have high linearity. Thus, elements included in the amplifier 1203 can be used at levels close to their saturation levels, resulting in high efficiency. Also, since there are a small number of components dependent on analog characteristics, it is easy to ensure linearity.

However, with any of the transmitting circuit devices shown in FIGS. 27, 28, and 30, quantization noise occurs when the input signal to the delta sigma modulator is delta-sigma modulated. To reduce the quantization noise, it is necessary to use a bandpass filter with steep characteristics.

A bandpass filter with steep characteristics has a large size, which increases the circuit scale of the transmitting circuit device accordingly. Also, a bandpass filter with steep characteristics involves high losses, decreasing the efficiency of the transmitting circuit device itself.

Thus, the proposed transmitting circuit devices have the problem of increased size resulting from the large size of the bandpass filter.

Also, the proposed transmitting circuit devices have the problem of lowered efficiency resulting from the high losses of the bandpass filter.

In view of the above problems, the present invention has an object to provide a transmitting circuit device and wireless communications device small in size.

Also, in view of the above problems, the present invention has an object to provide a transmitting circuit device and wireless communications device which have high efficiency.

SUMMARY OF THE INVENTION

The $1^{st}$ aspect of the present invention is a transmitting circuit device, comprising:
a first signal source which outputs a first signal that is a binary or multilevel discrete analog signal or an analog signal with a binary or multilevel discrete envelope and that has signal components and quantization noise components;
a second signal source which outputs a second signal composed of the quantization noise components;
a first amplifier which amplifies the first signal; and
a combiner which cancels out the quantization noise components by combining an output of the first amplifier and the second signal.

The $2^{nd}$ aspect of the present invention is the transmitting circuit device according to the $1^{st}$ aspect, comprising a signal processor which performs signal processing on incoming third vector data, and thereby outputs (1) first vector data that is a signal whose envelope can take a smaller number of values when vector-modulated than can a signal envelope obtained by vector-modulating the third vector data and (2) second vector data that is a signal obtained by subtracting the third vector data from the first vector data, wherein:
the first signal source is a first vector modulator which vector-modulates the incoming first vector data;
the first signal is an output of the first vector modulator;
the second signal source is a second vector modulator which vector-modulates the incoming second vector data; and
the second signal is an output of the second vector modulator.

The $3^{rd}$ aspect of the present invention is the transmitting circuit device according to the $2^{nd}$ aspect, wherein a low pass filter is installed between the signal processor and the second vector modulator.

The $4^{th}$ aspect of the present invention is the transmitting circuit device according to the $2^{nd}$ aspect, comprising an auxiliary amplifier which amplifies output of the second vector modulator, wherein:
the combiner cancels out the quantization noise components contained in the output of the first amplifier by combining the output of the first amplifier and output of the auxiliary amplifier.

The $5^{th}$ aspect of the present invention is the transmitting circuit device according to the $4^{th}$ aspect, wherein a low pass filter is installed between the signal processor and the second vector modulator or a band pass filter is installed between the second vector modulator and the auxiliary amplifier.

The $6^{th}$ aspect of the present invention is a transmitting circuit device, comprising:
a first divider which divides an incoming signal in two;
a delta sigma modulator which delta-sigma modulates a signal from the first output of the first divider;
a second divider which divides a signal from an output of the delta sigma modulator in two;
a main amplifier which amplifies a signal from the first output of the second divider;
a first combiner which combines a signal from the second output of the first divider and a signal from the second output of the second divider; and
a second combiner which combines a signal from an output of the main amplifier and a signal from an output of the first combiner,
wherein the signal at one input and the signal at the other input to the first combiner have been adjusted to be virtually equal in amplitude and opposite in phase, and
the signal at one input and the signal at the other input to the second combiner have been adjusted to be virtually equal in amplitude and opposite in phase.

The $7^{th}$ aspect of the present invention is a transmitting circuit device, comprising:
a first divider which divides an incoming signal in two;
a delta sigma modulator which delta-sigma modulates a signal from the first output of the first divider;
a second divider which divides a signal from an output of the delta sigma modulator in two;
a main amplifier which amplifies a signal from the first output of the second divider;
a first vector regulator which adjusts the amplitude and phase of a signal from the second output of the first divider;
a first combiner which combines a signal from an output of the first vector regulator and a signal from the second output of the second divider;
a second vector regulator which adjusts the amplitude and phase of a signal from an output of the first combiner;
an auxiliary amplifier which amplifies a signal from an output of the second vector regulator;
a second combiner which combines a signal from the output of the main amplifier and a signal from the output of the auxiliary amplifier,
wherein the signal at one input and the signal at the other input to the first combiner have been adjusted to be virtually equal in amplitude and opposite in phase, and
the signal at one input and the signal at the other input to the second combiner have been adjusted to be virtually equal in amplitude and opposite in phase.

The $8^{th}$ aspect of the present invention is the transmitting circuit device according to the $7^{th}$ aspect, wherein a band pass filter is installed between the first combiner and the second vector regulator or between the second vector regulator and the auxiliary amplifier.

The $9^{th}$ aspect of the present invention is the transmitting circuit device according to the $7^{th}$ aspect, wherein a digital signal is input in all or some of the first divider, the delta sigma modulator, the second divider, the first vector regulator, the second combiner, and the second vector regulator.

The $10^{th}$ aspect of the present invention is a transmitting circuit device, comprising:
a first divider which divides amplitude modulation data received from a data generator which generates the amplitude modulation data and angle modulation data, in two;
a delta sigma modulator which delta-sigma modulates a signal from the first output of the first divider;

a second divider which divides a signal from an output of the delta sigma modulator in two;

a first vector regulator which adjusts the amplitude and phase of a signal from the second output of the first divider;

a first combiner which combines a signal from the first output of the second divider and a signal from an output of the first vector regulator;

an angle modulator which angle-modulates the angle modulation data received;

a third divider which divides a signal from an output of the angle modulator in two;

a first multiplier which multiplies a signal from the second output of the second divider and a signal from the first output of the third divider;

a second multiplier which multiplies a signal from the first output of the first combiner and a signal from the second output of the third divider;

a second vector regulator which adjusts the amplitude and phase of a signal from the first output of the second multiplier; and a second combiner which combines a signal from an output of the first multiplier and a signal from an output of the second vector regulator, wherein the signal at one input and the signal at the other input to the first combiner have been adjusted to be virtually equal in amplitude and opposite in phase, and the signal at one input and the signal at the other input to the second combiner have been adjusted to be virtually equal in amplitude and opposite in phase.

The $11^{th}$ aspect of the present invention is the transmitting circuit device according to the $10^{th}$ aspect, wherein a low pass filter is installed between the first combiner and the second multiplier.

The $12^{th}$ aspect of the present invention is a transmitting circuit device, comprising:

a first divider which divides amplitude modulation data received from a data generator which generates the amplitude modulation data and angle modulation data, in two;

a delta sigma modulator which delta-sigma modulates a signal from the first output of the first divider;

an angle modulator which angle-modulates the angle modulation data received;

a second divider which divides a signal from an output of the angle modulator in two;

a first multiplier which multiplies a signal from the first output of the second divider and a signal from an output of the delta sigma modulator;

a third divider which divides a signal from an output of the first multiplier in two;

a second multiplier which multiplies a signal from the second output of the second divider and a signal from the second output of the first divider;

a first vector regulator which adjusts the amplitude and phase of a signal from an output of the second multiplier;

a first combiner which combines a signal from the first output of the third divider and a signal from an output of the first vector regulator;

a second vector regulator which adjusts the amplitude and phase of a signal from an output of the first combiner;

an auxiliary amplifier which amplifies a signal from an output of the second vector modulator; and a second combiner which combines a signal from the second output of third divider and a signal from an output of the auxiliary amplifier, wherein the signal at one input and the signal at the other input to the first combiner have been adjusted to be virtually equal in amplitude and opposite in phase, and the signal at one input and the signal at the other input to the second combiner have been adjusted to be virtually equal in amplitude and opposite in phase.

The $13^{th}$ aspect of the present invention is the transmitting circuit device according to the $12^{th}$ aspect, wherein a band pass filter is installed between the first combiner and the second vector regulator or between the second vector regulator and the auxiliary amplifier.

The $14^{th}$ aspect of the present invention is a transmitting circuit device, comprising:

a delta sigma modulator which delta-sigma modulates amplitude modulation data received from a data generator which generates the amplitude modulation data and angle modulation data;

an angle modulator which angle-modulates the angle modulation data received;

a multiplier which multiplies a signal from an output of the delta sigma modulator and a signal from an output of the angle modulator;

a divider which divides an output of the multiplier;

a vector modulator which modulates an incoming vector signal;

a first vector regulator which adjusts the amplitude and phase of a signal from an output of the vector modulator;

a first combiner which combines a signal from a first output of the divider and a signal from an output of the first vector regulator;

a second vector regulator which is connected to output of the first combiner; and a second combiner which combines a signal from a second output of the divider and a signal from an output of the second vector regulator, wherein the signal at one input and the signal at the other input to the first combiner have been adjusted to be virtually equal in amplitude and opposite in phase, and the signal at one input and the signal at the other input to the second combiner have been adjusted to be virtually equal in amplitude and opposite in phase.

The $15^{th}$ aspect of the present invention is the transmitting circuit device according to the $14^{th}$ aspect, comprising an auxiliary amplifier which amplifies a signal from an output of the second vector regulator and outputs it to the second combiner, wherein a band pass filter is installed between the first combiner and the second vector regulator or between the second vector regulator and the auxiliary amplifier.

The $16^{th}$ aspect of the present invention is the transmitting circuit device according to any of the $10^{th}$ to $14^{th}$ aspects, wherein amplitude modulation data is a digitalized data.

The $17^{th}$ aspect of the present invention is the transmitting circuit device according to any of the $7^{th}$, $12^{th}$, or $14^{th}$ aspects, wherein an auxiliary amplifier is connected to at least one of the vector regulators and a predistortion circuit is installed in a stage preceding the auxiliary amplifier.

The $18^{th}$ aspect of the present invention is the transmitting circuit device according to any of the $7^{th}$ to $15^{th}$ aspects, wherein a bandpass filter is installed in a stage upstream or downstream of the second combiner.

The $19^{th}$ aspect of the present invention is the transmitting circuit device according to the $18^{th}$ aspect, wherein the bandpass filter varies its pass band with the transmit frequency.

The $20^{th}$ aspect of the present invention is a transmitting circuit device, comprising:

a delta sigma modulator which delta-sigma modulates an incoming I signal;

a first divider which divides a signal from an output of the delta sigma modulator in two;

a first vector regulator which adjusts the amplitude and phase of the incoming I signal;

a first combiner which combines a signal from the first output of the first divider and a signal from an output of the a first vector regulator;

a signal generator which generates a local oscillator signal;

a phase shifter which phase-shifts an output signal of the signal generator;

a first multiplier which multiplies a signal from an output of the first combiner and an output signal from the phase shifter;

a second vector regulator which adjusts the amplitude and phase of a signal from an output of the first multiplier;

a second multiplier which multiplies a signal from the second output of the first divider and the output signal from the phase shifter;

a second combiner which combines a signal from an output of the second vector regulator and a signal from an output of the second multiplier;

a delta sigma modulator which delta-sigma modulates an incoming Q signal;

a second divider which divides a signal from an output of the delta sigma modulator in two;

a third vector regulator which adjusts the amplitude and phase of the incoming Q signal;

a third combiner which combines a signal from the first output of the second divider and a signal from an output of the third vector regulator;

a third multiplier which multiplies a signal from an output of the third combiner and a signal from an output of the phase shifter;

a fourth vector regulator which adjusts the amplitude and phase of a signal from an output of the third multiplier;

a fourth multiplier which multiplies a signal from the second output of the second divider and the output signal from the phase shifter;

a fourth combiner which combines a signal from the first output of the fourth vector regulator and a signal from an output of the fourth multiplier; and a fifth combiner which combines a signal from an output of the second combiner and a signal from an output of the fourth combiner;

wherein the signal at one input and the signal at the other input to the first combiner have been adjusted to be virtually equal in amplitude and opposite in phase, the signal at one input and the signal at the other input to the second combiner have been adjusted to be virtually equal in amplitude and opposite in phase, the signal at one input and the signal at the other input to the third combiner have been adjusted to be virtually equal in amplitude and opposite in phase, and the signal at one input and the signal at the other input to the fourth combiner have been adjusted to be virtually equal in amplitude and opposite in phase.

The $21^{st}$ aspect of the present invention is the transmitting circuit device according to the $20^{th}$ aspect, wherein:

a low pass filter is installed between the first combiner and the first multiplier; and a low pass filter is installed between the third combiner and the third multiplier.

The $22^{nd}$ aspect of the present invention is the transmitting circuit device according to the $20^{th}$ aspect, wherein a bandpass filter is installed in at least one or more places from among a stage upstream or downstream of the second combiner, a stage upstream or downstream of the fourth combiner, and a stage upstream or downstream of the fifth combiner.

The $23^{rd}$ aspect of the present invention is a wireless communications device, comprising:

a transmitting circuit which outputs transmit signals; and a receive circuit which receives receive signals, wherein the transmitting circuit device according to any of the $1^{st}$ to $14^{th}$ and the $20^{th}$ to $22^{nd}$ aspects is used for the transmitting circuit.

BRIEF DESCRIPTION OF THE DRAWINGS

FIG. 29(a) is a diagram showing an example of a signal which has been frequency-modulated by a frequency modulator.

FIG. 29(b) is a diagram showing amplitude modulation data at an input to the delta sigma modulator.

FIG. 29(c) is a diagram showing amplitude modulation data at an output from the delta sigma modulator.

DESCRIPTION OF SYMBOLS

Figure 1:
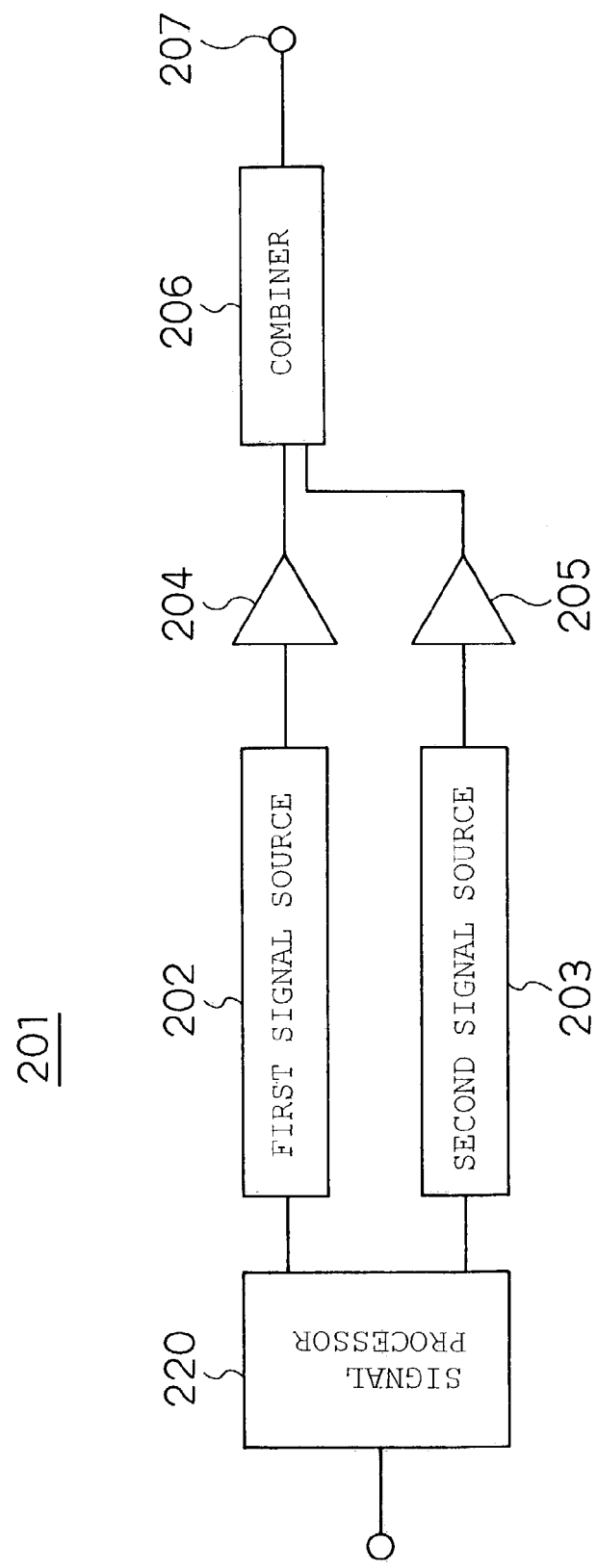
FIG. 1 is a block diagram of a transmitting circuit device according to a first embodiment of the present invention.

1 Transmitting circuit device
3 First divider
4 Delta sigma modulator
5 Second divider
6 Main amplifier
7 First vector regulator
8 First combiner
9 Second vector regulator
10 Auxiliary amplifier
11 Second combiner
12 Output terminal

PREFERRED EMBODIMENTS OF THE INVENTION

Embodiments of the present invention will be described below with reference to the drawings.

A first embodiment will first be described.

FIG. 1 shows a configuration of a transmitting circuit device 201 according to the first embodiment.

The transmitting circuit device 201 consists of a first signal source 202, second signal source 203, main amplifier 204, auxiliary amplifier 205, combiner 206, output terminal 207, and signal processor 220.

The signal processor 220 performs signal processing based on input data and sends the processed data to the first signal source 202 and second signal source 203.

The first signal source 202 generates an analog signal containing signal components and quantization noise components based on input data from the signal processor 220.

The second signal source 203 generates an analog signal containing only the quantization noise components from the first signal source 202 based on input data from the signal processor 220.

The main amplifier 204 amplifies a signal from an output of the first signal source 202.

The auxiliary amplifier 205 amplifies a signal from an output of the second signal source 203.

The combiner 206 combines a signal from an output of the main amplifier 204 and a signal from an output of the auxiliary amplifier 205.

Incidentally, the main amplifier 204 according to this embodiment is an example of an amplifier according to the present invention.

Next, operation of this embodiment will be described.

Figure 18:
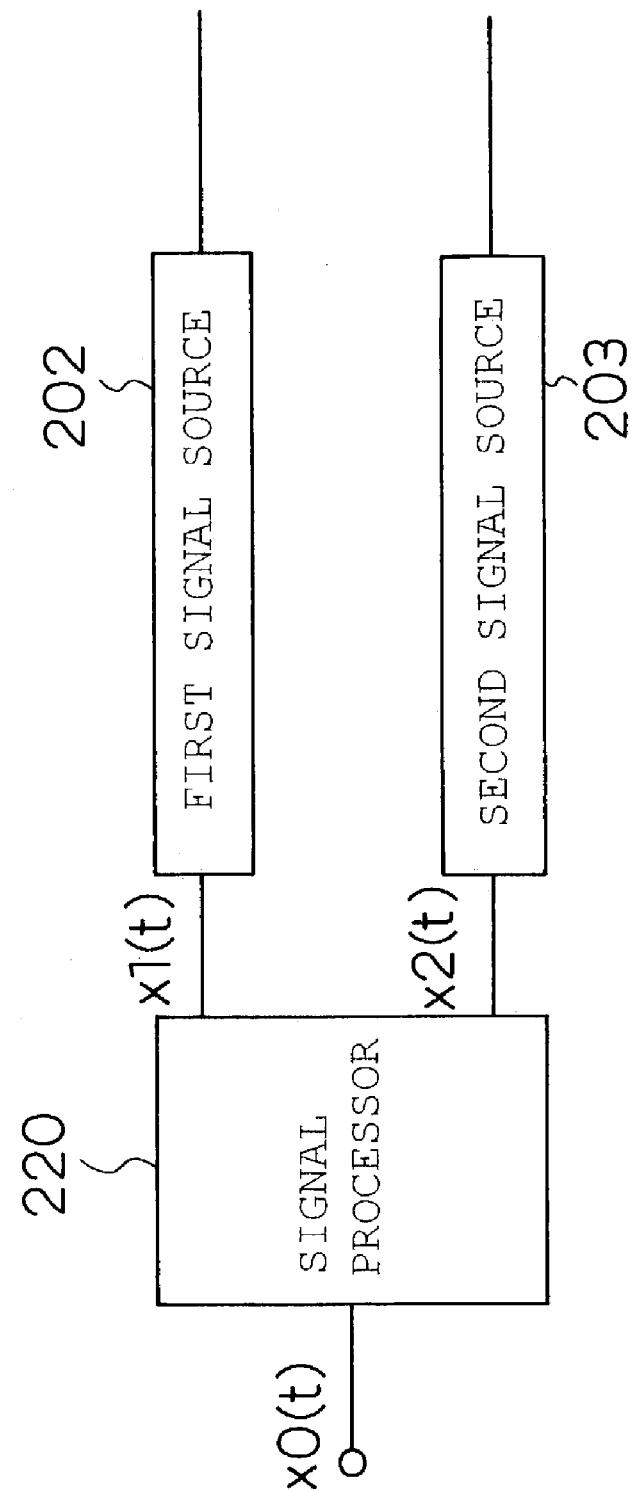
FIG. 18 is an explanatory diagram illustrating an algorithm for signal generation in a second signal source 203 according to the first embodiment of the present invention.

FIG. 18 shows an explanatory diagram illustrating signal generation. Specifically, assuming that an input signal to the signal processor 220, input signal to the first signal source, and input signal to the second signal source 203 are $x0(t)$, $x1(t)$, and $x2(t)$, respectively, $x2(t)$ is determined using $x2(t)=x1(t)-x0(t)$. On the other hand, $x1(t)$ is determined by delta-sigma modulating $x0(t)$.

Figure 3:
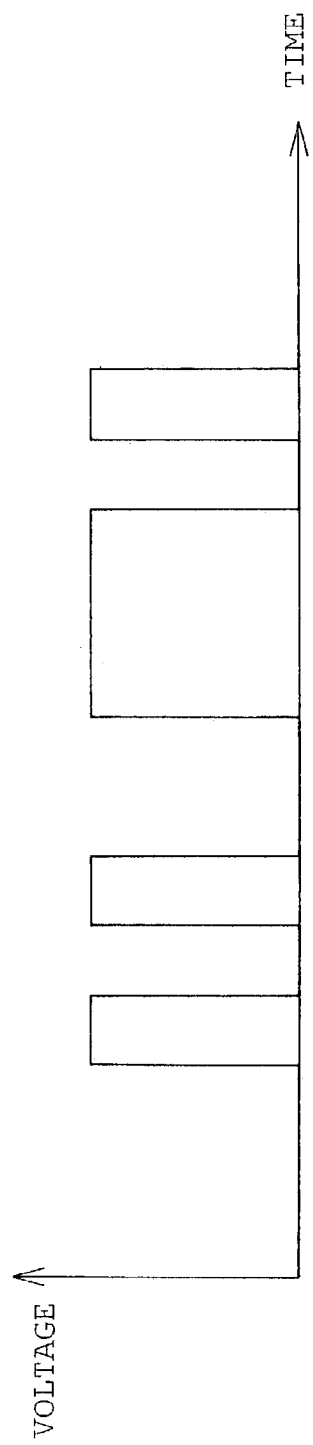
FIG. 3(a) ia a diagram showing an example of a signal generated by a first signal source.
FIG. 3(b) is a diagram showing another example of a signal generated by the first signal source.
Figure 3:
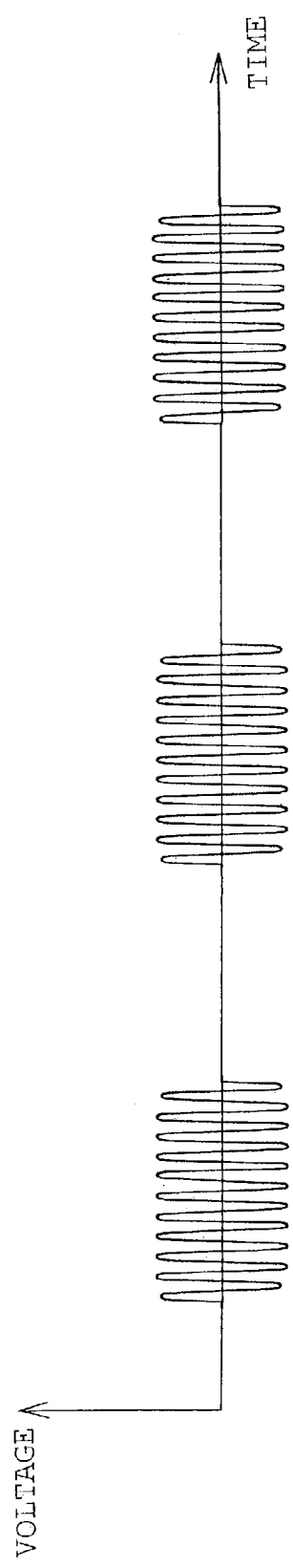

The first signal source 202 generates binary or multilevel discrete analog signals and outputs them to the main amplifier 204. FIG. 3(a) shows an example of a signal generated by the first signal source 202. This is a binary signal obtained, for example, by delta-sigma modulating an input signal to the first signal source 202 and contains components of the input signal to the first signal source 202 and quantization noise components generated during the delta sigma modulation.

In this way, the first signal source 202 outputs a signal which contains signal components and quantization noise components.

On the other hand, the second signal source 203 outputs a signal which corresponds to the quantization noise components contained in the output from the first signal source 202.

The main amplifier 204 amplifies the signal from the output of the first signal source 202 and outputs it to the combiner 206.

On the other hand, the auxiliary amplifier 205 amplifies the signal from the output of the second signal source 203 and outputs it to the combiner 206.

In the input to the combiner 206, the quantization noise components contained in the output from the first signal source 202 and the signal from the second signal source 203 have been adjusted to be equal in amplitude and opposite in phase by the vector regulator (not shown) or the like. Thus, as these signals are combined by the combiner 206, the quantization noise components are cancelled out and only the signal components appear on the output terminal 207.

Depending on differences between paths in delay time, gain, or phase passed through, the operation $x2(t)=x1(t)-x0(t)$ may not be able to suppress quantization noise sufficiently. In that case, it becomes necessary to adjust the two signals inputted in the combiner to be equal in amplitude and opposite in phase. FIG. 19(a) shows an adjustment method of adjusting the quantization noise component contained in a signal from the first signal source 202 and a signal from the second signal source 203 to be equal in amplitude and opposite in phase. Specifically, combiner output is input into a divider and part of divider output is fed back. More specifically, the part of the divider output is input into a quantization noise monitor, which then detects the magnitude of quantization noise which has not been cancelled out by the combiner.

According to the quantization noise level detected by the quantization noise monitor, a controller controls the signal processor in such a way as to minimize the magnitude of the quantization noise outputted from the combiner.

FIG. 19(b) shows a configuration example of the quantization noise monitor. A band pass filter passes signals which fall within the certain frequency range in which quantization noise is contained. The magnitude of the signals is detected by a power detector. This configuration can suppress quantization noise in a stable and effective manner.

Figure 20:
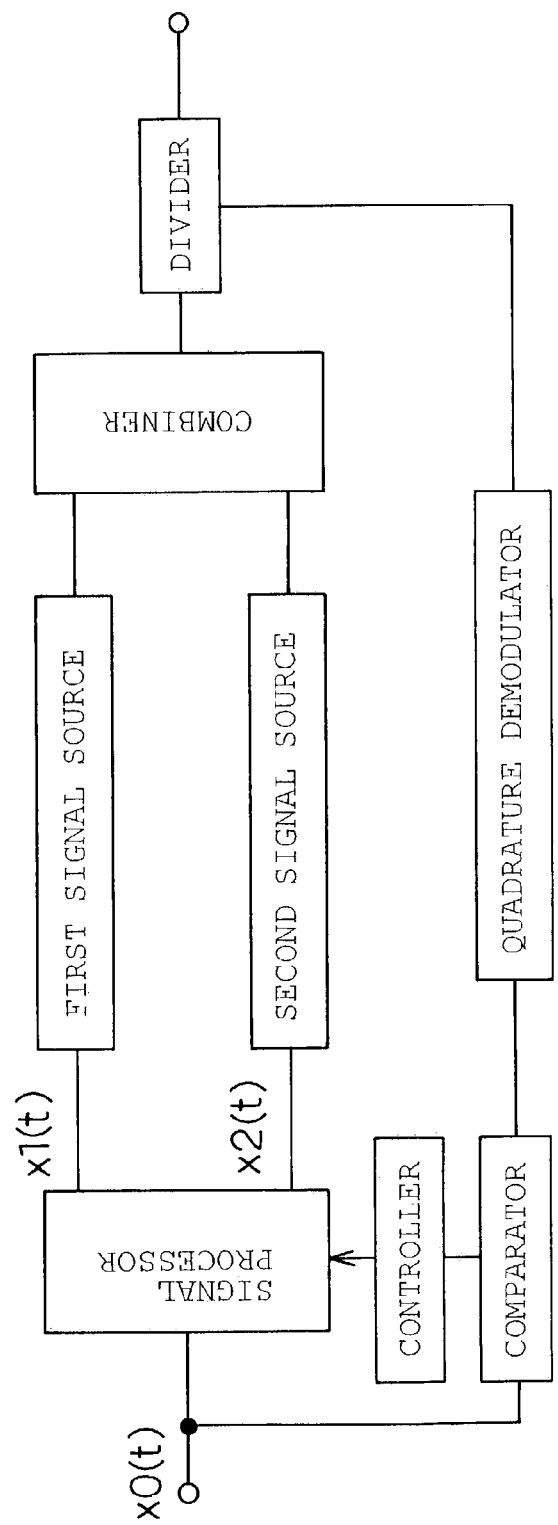
FIG. 20 is a diagram showing another example of a control system which makes two input signals in a combiner equal in amplitude and opposite in phase.

FIG. 20 shows another example of a control system which makes two input signals in a combiner equal in amplitude and opposite in phase. Combiner output is input into a divider and part of divider output is fed back. Specifically, the part of the divider output is input into a demodulator, which demodulates the signal.

A comparator compares the demodulated signal from the demodulator with the original signal while a controller controls a signal processor so as to reduce error. This configuration can suppress quantization noise in a stable and effective manner.

Although it has been explained with reference to FIGS. 19 and 20 that what is controlled is the signal processor, it is also possible to control a vector regulator installed at the output of the first signal source or output of the second signal source.

According to this embodiment, since the output from the first signal source 202 is a binary or multilevel discrete analog signal, the main amplifier 204 can be operated properly even in non-linear regions. Thus, even if the main amplifier 204 is made to perform class B operation or class C operation nearly at its saturation level, signals with sufficiently reduced distortion components can be obtained from the output terminal.

If the first signal source 202 outputs binary analog signals, in particular, a switching amplifier can be used as the main amplifier 204. On the other hand, even if the first signal source 202 outputs signals whose envelopes have small numbers of available values instead of outputting binary analog signals, linearity can be ensured easily.

Thus, the transmitting circuit device 201 according to this embodiment can achieve reduction in power consumption.

Furthermore, since the transmitting circuit device 201 according to this embodiment can cancel out quantization noise components without using a bandpass filter, it can achieve reduction in size.

Although it has been explained that the first signal source 202 according to this embodiment outputs binary or multilevel discrete analog signals, this is not restrictive. The first signal source 202 may output analog signals whose envelopes are binary or multilevel. FIG. 3(b) shows such a signal: an example of a signal whose envelope is binary.

Figure 14:
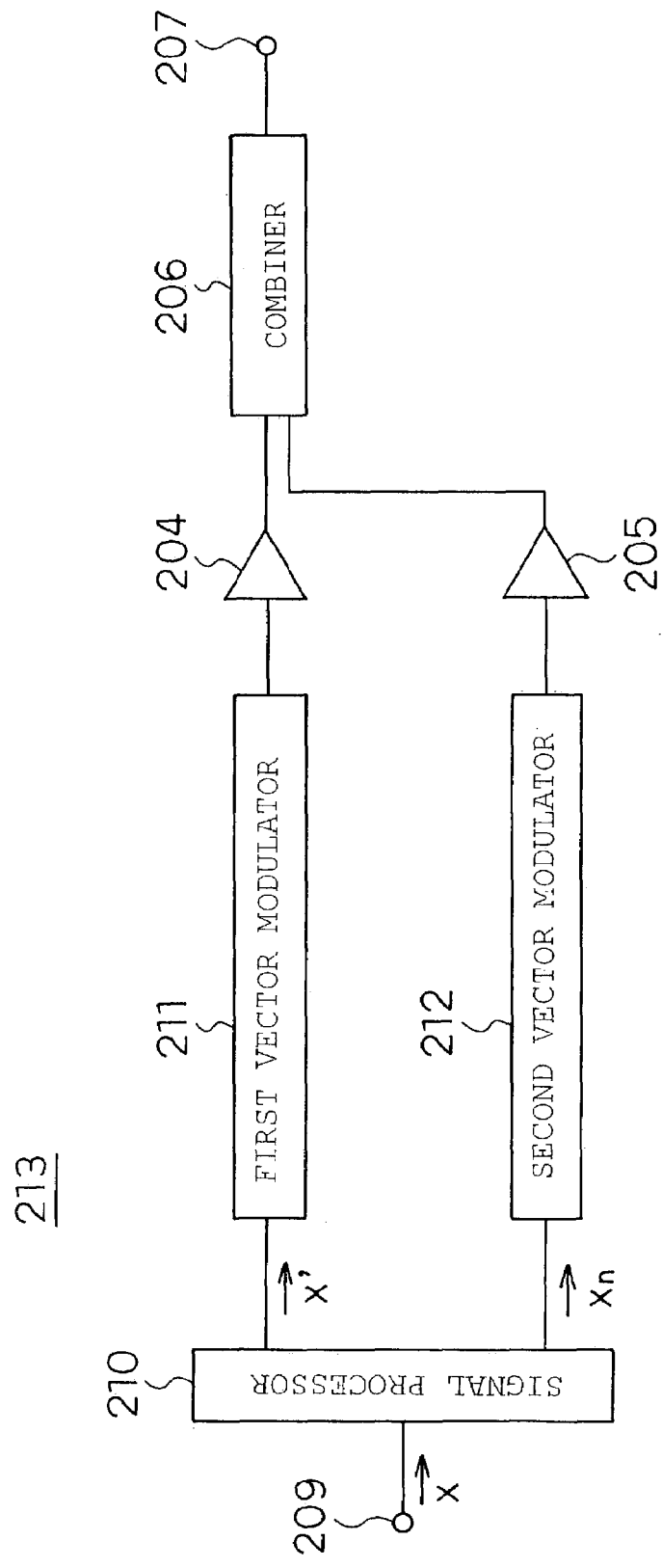
FIG. 14 is a block diagram of a transmitting circuit device according to the first embodiment of the present invention.

FIG. 14 shows a configuration of a transmitting circuit device 213 in which the first signal source 202 outputs analog signals whose envelopes are binary or multilevel The transmitting circuit device 213 consists of an input terminal 209, signal processor 210, first vector modulator 211, second vector modulator 212, main amplifier 204, auxiliary amplifier 205, combiner 206, and output terminal 207.

The first vector modulator 211 in FIG. 14 corresponds to the first signal source 202 and the second vector modulator 212 corresponds to the second signal source 203.

The input terminal 209 is used to enter vector data (hereinafter referred to as the vector data x) in the signal processor 210. The vector data x consists of an I signal and Q signal.

The signal processor 210 is a circuit which performs signal processing on the vector data x and outputs first vector data (hereinafter referred to as the first vector data x') and second vector data (hereinafter referred to as the second vector data xn) to the first vector modulator 211 and second vector modulator 212, respectively.

The first vector modulator 211 is a circuit which vector-modulates carrier waves with the incoming first vector data x'

The second vector modulator 212 is a circuit which vector-modulates carrier waves with the incoming second vector data xn.

The main amplifier 204 is a circuit which amplifies signals from output of the first vector modulator 211.

The auxiliary amplifier 205 is a circuit which amplifies signals from output of the second vector modulator 212.

The combiner 206 is a circuit which combines a signal from an output of the main amplifier 204 and a signal from an output of auxiliary amplifier 205.

The output terminal 207 is used to output the signals outputted by the combiner 206.

Next, operation of this embodiment will be described.

The vector data x entering through the input terminal 209 is input in the signal processor 210.

The signal processor 210 performs signal processing on the incoming vector data x and outputs the first vector data x' and second vector data xn to the first vector modulator 211 and second vector modulator 212, respectively.

The first vector data x' is a signal such that a signal envelope can take a smaller number of values when the carrier wave is vector-modulated with the first vector data x' than when the carrier wave is vector-modulated with the vector data x. This means that the number of values available to the size of the vector data x is larger than the number of values available to the size of the first vector data x'. The size of the vector data x here is the square root of the sum of the square of I signal and the square of Q signal.

The vector data xn is the signal obtained by subtracting the vector data x from the first vector data x'. In other words, the vector data xn is given by xn=x'−x. Thus, the vector data xn is a quantization noise component of the first vector data x'.

After performing the signal processing described above, the signal processor 210 outputs the first vector data x' and second vector data xn to the first vector modulator 211 and second vector modulator 212, respectively.

The first vector modulator 211 vector-modulates the carrier wave with the incoming first vector data x' outputted from the signal processor 210.

The second vector modulator 212 vector-modulates the carrier wave with the incoming second vector data xn outputted from the signal processor 210.

The main amplifier 204 amplifies the signal from the output of the first vector modulator 211 and outputs it to the combiner 206.

The auxiliary amplifier 205 amplifies the signal from the output of the second vector modulator 212 and outputs it to the combiner 206.

In the input to the combiner 206, the quantization noise components contained in the output of the main amplifier 204 and the signal from the output of the auxiliary amplifier 205 have been adjusted to be equal in amplitude and opposite in phase by a vector regulator (not shown) or the like. Thus, as these signals are combined by the combiner 206, the quantization noise components are cancelled out and only the signal components appear on the output terminal 207.

According to this embodiment, since the envelope of the signal from the output of the first vector modulator 211 can take a smaller number of values than can the envelope of the signal obtained by vector-modulating the carrier wave with the vector data x, the main amplifier 204 can be operated properly even in non-linear regions. Thus, even if the main amplifier 204 is made to perform class B operation or class C operation nearly at its saturation level, signals with sufficiently reduced distortion components can be obtained from the output terminal.

In particular, if the envelope of the first vector modulator 211 outputs binary signals, i.e., if the size of the first vector data x' can take two values—0 or a positive real number, a switching amplifier can be used as the main amplifier 204.

In this way, the transmitting circuit device 213 according to this embodiment can achieve reduction in power consumption.

Figure 19:
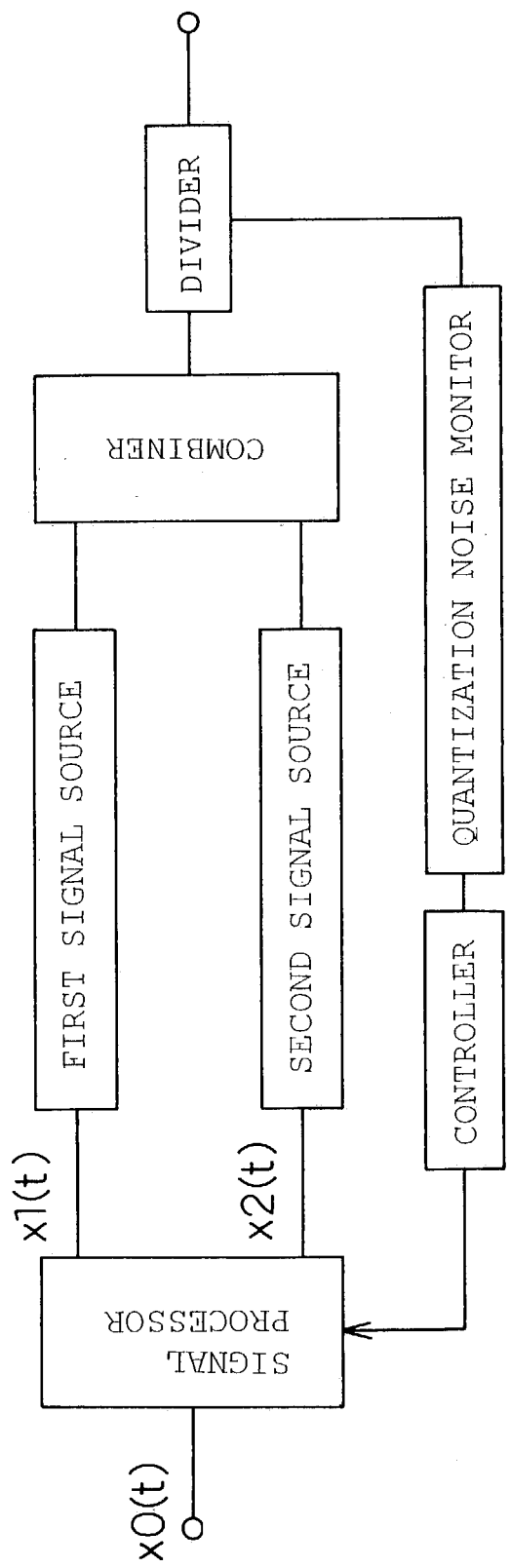
FIG. 19(a) is a diagram illustrating how quantization noise components of a signal generated by a first signal source 202 and a signal generated by the second signal source 203 are adjusted to be equal in amplitude and opposite in phase according to the first embodiment of the present invention.
FIG. 19(b) is a diagram showing a configuration example of a quantization noise monitor according to the first embodiment of the present invention.
Figure 19:
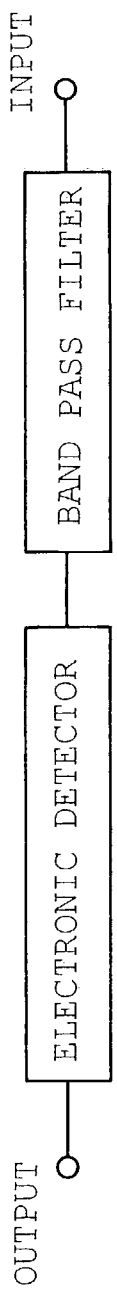

Incidentally, even if the first signal source and second signal source are vector modulators, it is possible to control signals to be equal in amplitude and opposite in phase in the same manner as in FIGS. 19 and 20.

Furthermore, since the transmitting circuit device 213 according to this embodiment can cancel out quantization noise components without using a bandpass filter, it can achieve reduction in size. Moreover, since there is no loss of a bandpass filter, it can achieve high efficiency.

Figure 15:
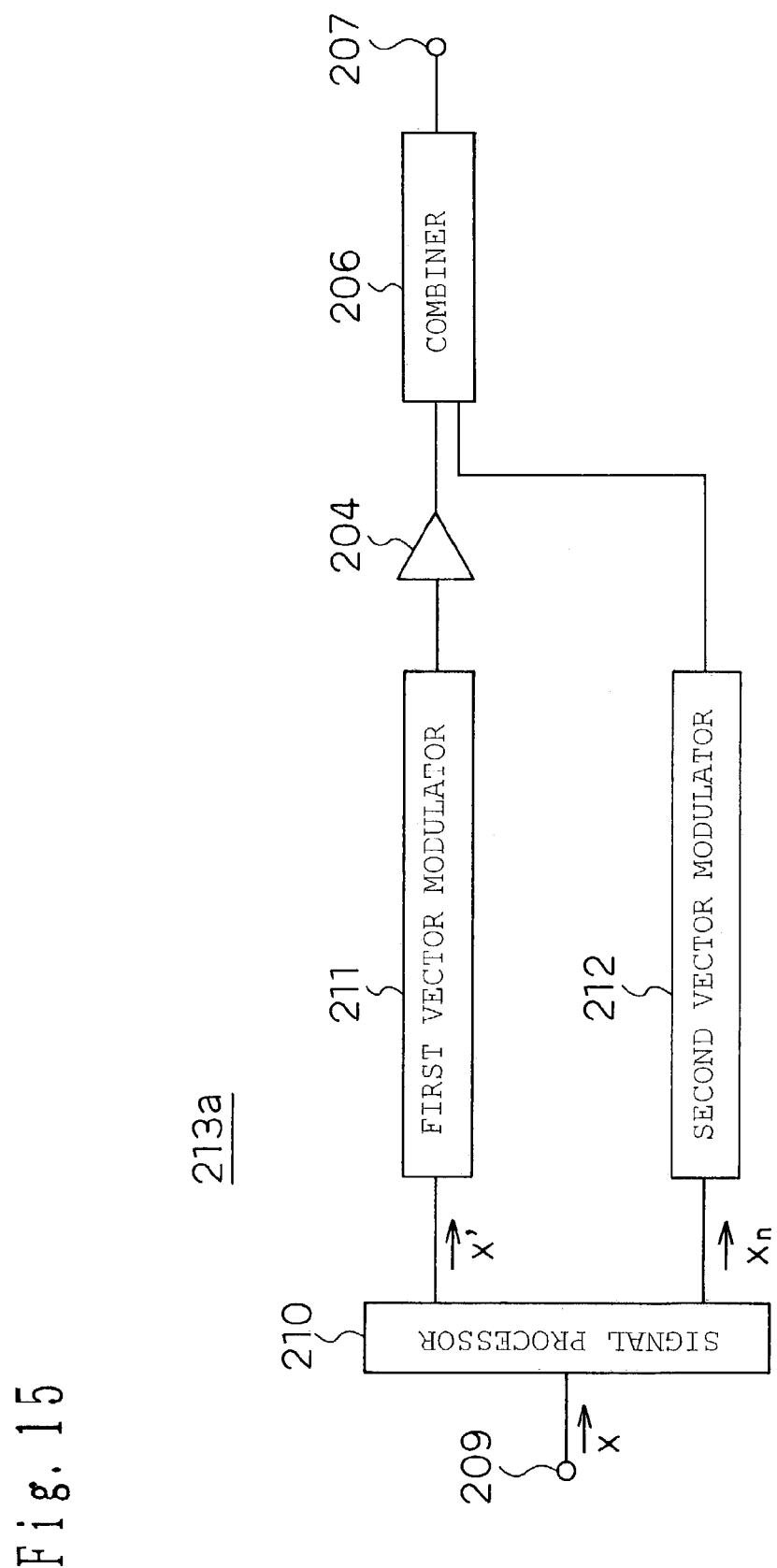
FIG. 15 is a block diagram of another transmitting circuit device according to the first embodiment of the present invention.

Although it has been explained that the transmitting circuit device 213 according to this embodiment comprises the auxiliary amplifier 205, it may be configured without the auxiliary amplifier 205 as with a transmitting circuit device 213a shown in FIG. 15.

Although it has been explained that no filter is used to reduce quantization noise components, a bandpass filter may be installed on the side of out put of the combiner 206 to reduce the quantization noise components and pass signal components. Even in that case, since quantization noise components are reduced sufficiently by the combiner 206, there is no need for the bandpass filter to have steep characteristics and it can be a small-sized, low-loss filter.

The first vector data x' outputted from the signal processor 210 may be amplified by an amplifier before it is input in the first vector modulator 211. Similarly, the second vector data xn outputted from the signal processor 210 may be amplified by an amplifier before it is input in the second vector modulator 212.

Figure 2:
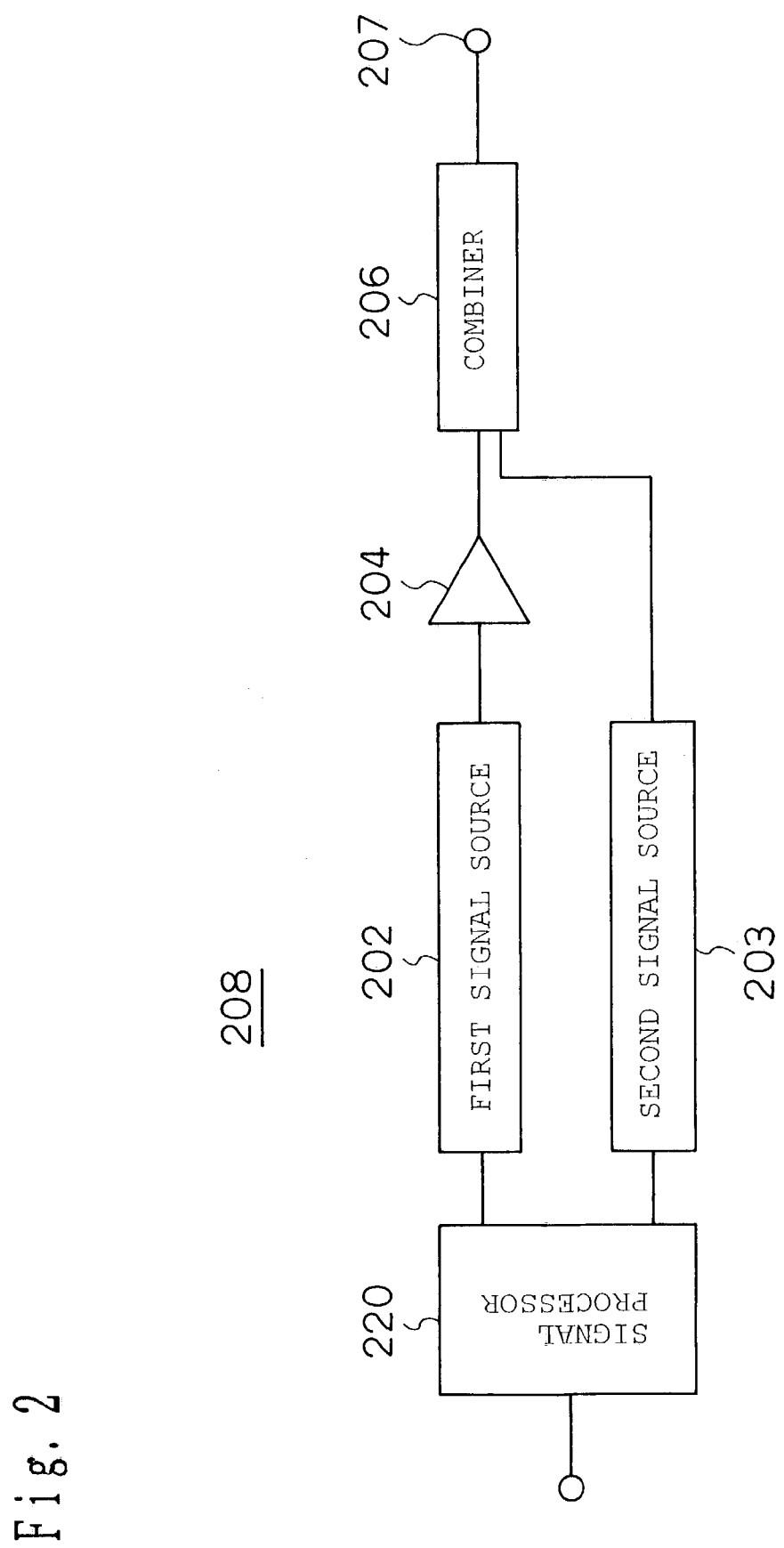
FIG. 2 is a block diagram of the transmitting circuit device according to the first embodiment of the present invention.

Although the transmitting circuit device 201 according to this embodiment comprises the auxiliary amplifier 205 in the example described above, it may not have the auxiliary amplifier 205 as with a transmitting circuit device 208 shown in FIG. 2.

Also, as described later in a second embodiment, if output of the second signal source 203 is quantization noise components of a delta-sigma modulated signal, the larger frequency detuning in a frequency domain becomes, the larger power becomes. Thus, signals inputted in the auxiliary amplifier 205 maintain high power over a wide range in the frequency domain. This also increases the electric power fed to the auxiliary amplifier 205, thus resulting in increased power consumption. To solve this problem, the output of the second signal source 203 can be band-limited by installing a band pass filter between the second signal source 203 and auxiliary amplifier 205. This decreases the electric power fed to the auxiliary amplifier 205, and thus reduces power consumption as well as quantization noise in the vicinity.

To reduce power consumption, a low pass filter may be installed between the signal processor 210 and second vector modulator 212. Alternatively, it is also possible to reduce power consumption by installing a band pass filter between the second vector modulator 212 and auxiliary amplifier 205. In that case, a band pass filter should also be installed on the output side of the combiner 206 to reduce unnecessary frequency components.

Although it has been explained in this embodiment that x1(t) is generated by delta-sigma modulating x0(t), this is not restrictive. It is possible to generate x1(t) by PWM as well as by delta modulating x0(t).

Next, a second embodiment will be described.

Figure 4:
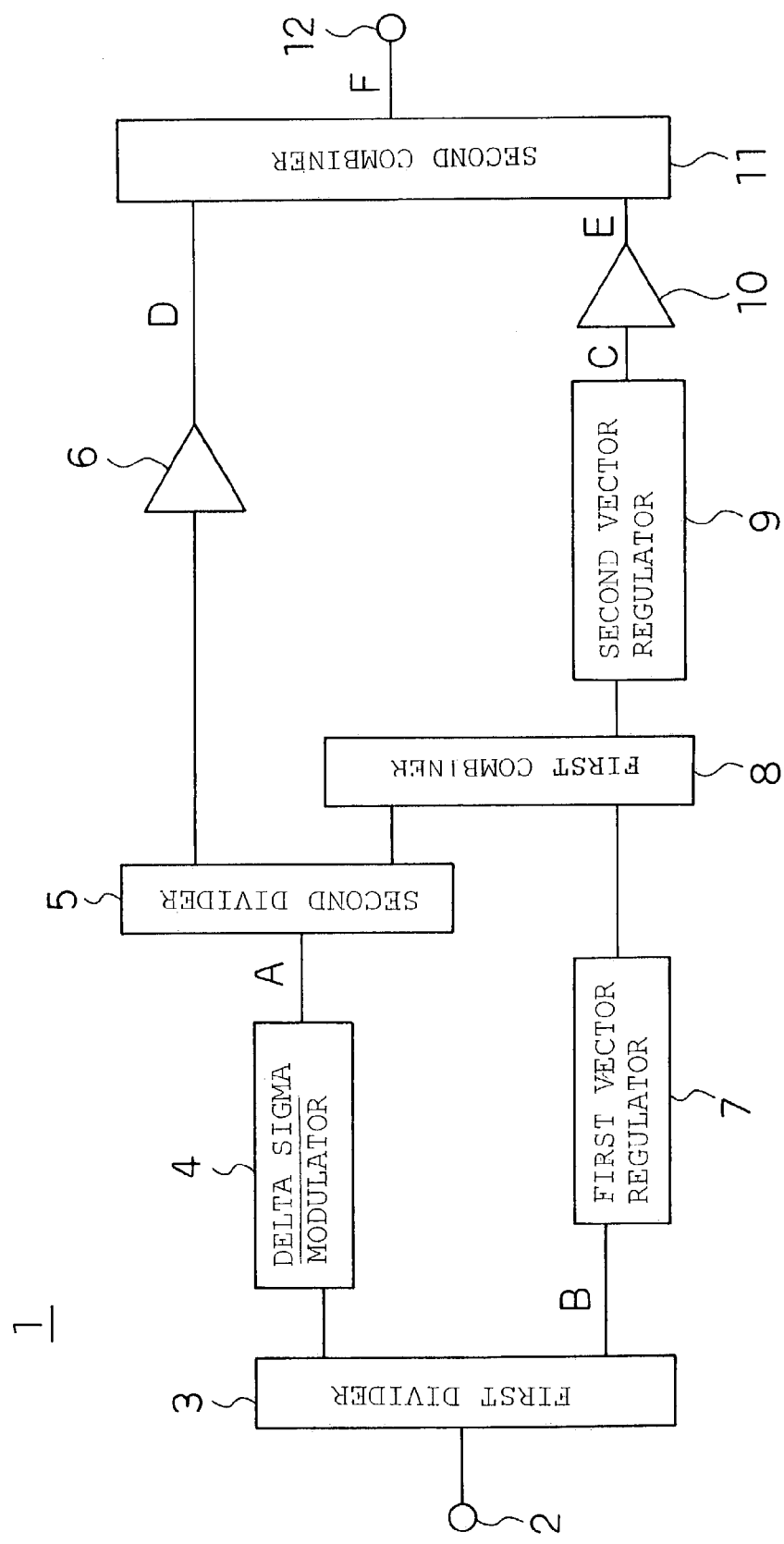
FIG. 4 is a block diagram of a transmitting circuit device according to a second embodiment of the present invention.

FIG. 4 shows a configuration of a transmitting circuit device 1 according to the second embodiment.

The transmitting circuit device 1 consists of an input terminal 2, first divider 3, delta sigma modulator 4, second divider 5, main amplifier 6, first vector regulator 7, first combiner 8, second vector regulator 9, auxiliary amplifier 10, second combiner 11, and output terminal 12. These circuit elements composing the transmitting circuit device 1 are intended for analog signal processing.

The first divider 3 and second divider 5 are circuits each of which divides an incoming signal in two. The delta sigma modulator 4 is a circuit which delta-sigma modulates an input signal and outputs a multilevel discrete analog signal.

The main amplifier 6 and auxiliary amplifier 10 amplify signals.

The first vector regulator 7 and second vector regulator 9 adjust the amplitude and phase of input signals and consist of a variable attenuator and variable phase shifter.

The first combiner 8 and second combiner 11 combine signals entering through two input ports and output the resulting signal.

Next, operation of this embodiment will be described.

An input signal, which is an analog signal, entering through the input terminal 2 is divided in two by the first divider 3, a signal from the first output of the first divider 3 is input in the delta sigma modulator 4 while a signal from the second output is input in the first vector regulator 7.

FIG. 6(b) shows a power spectrum of a signal at point B in FIG. 4, i.e., at an input to the first vector regulator 7. In FIG. 6(b), the horizontal axis represents frequency (MHz) while the vertical axis represents power (dBm). As can be seen from FIG. 6(b), the power spectrum at point B is distributed over a frequency band of 0.02 MHz around 900 MHz. Except for difference in power according to the split ratio at which the first divider 3 divides the signal, the signal at an input to the delta sigma modulator 4 is distributed similarly to FIG. 6(b). In this way, at an output of the first divider 3, signal components are distributed over a frequency band of 0.02 MHz around 900 MHz.

The delta sigma modulator 4 receives a signal from the first output of the first divider 3, quantizes it, and outputs a multilevel discrete analog signal. FIG. 6(a) shows a power spectrum of a signal at point A in FIG. 4, i.e., at an output of the delta sigma modulator 4. In FIG. 6(a), the horizontal axis represents frequency (MHz) while the vertical axis represents power (dBm). In FIG. 6(a), the power spectrum of the analog signal at the output of the delta sigma modulator 4 is distributed over a wide frequency band because of quantization noise produced when the analog signal is quantized by the delta sigma modulator 4. Thus, the signal outputted from the delta sigma modulator 4 consists of signal components distributed over a frequency band of 0.02 MHz around 900 MHz and quantization noise components distributed over a wide frequency band.

Figure 6:
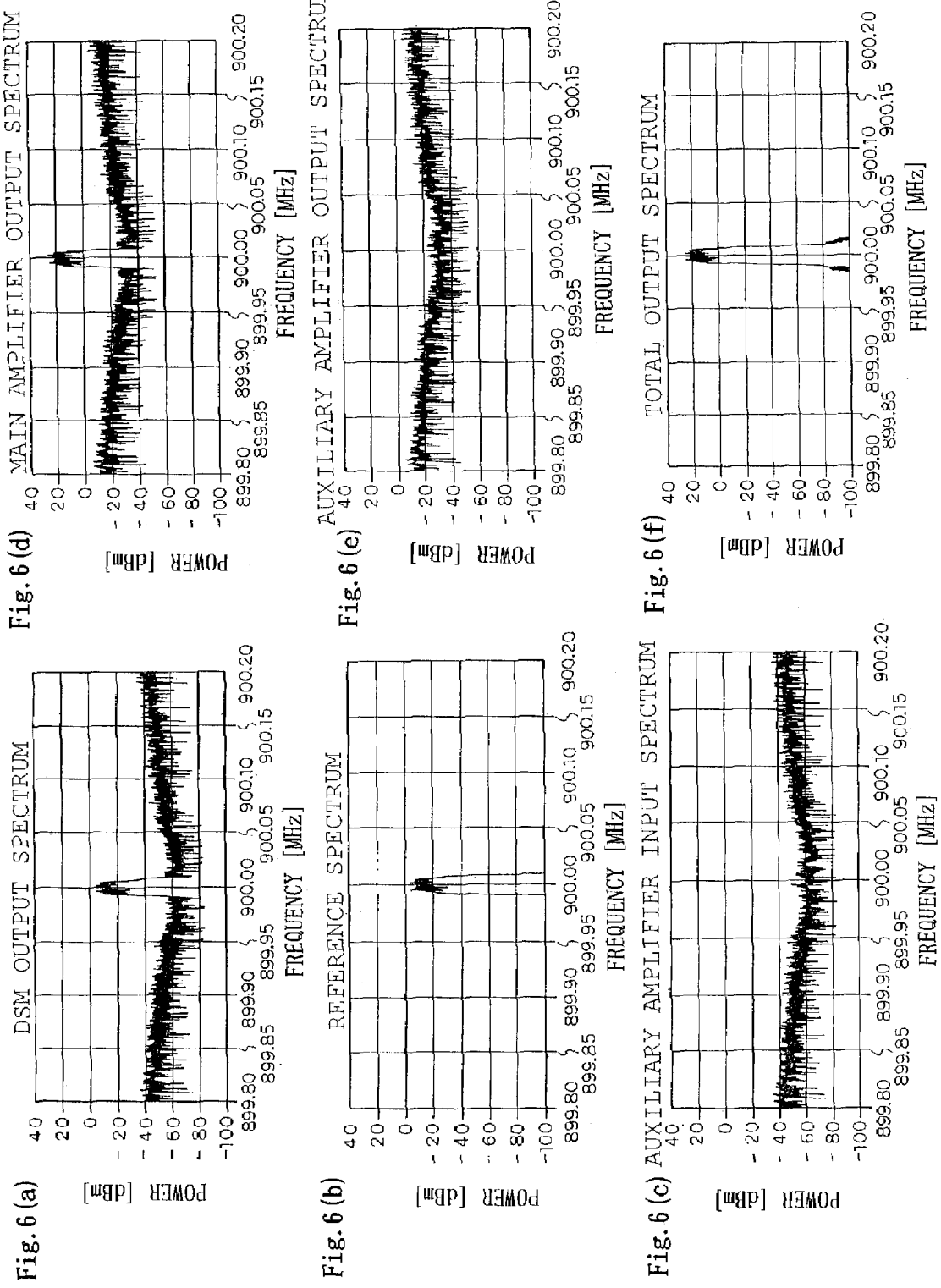
FIGS. 6(a) to (f) are Diagrams showing power spectra in the second embodiment of the present invention.

The analog signal outputted from the delta sigma modulator 4 is input in the second divider 5, where it is divided in two. The main amplifier 6 receives an analog signal from the first output of the second divider 5 and amplifies it. FIG. 6(*d*) shows a power spectrum of a signal at point D in FIG. 4, i.e., at an output of the main amplifier 6. In FIG. 6(*d*), the horizontal axis represents frequency (MHz) while the vertical axis represents power (dBm). Compared to the power spectrum in FIG. 6(*a*), the power spectrum in FIG. 6(*d*) shows increased power due to the amplification by the main amplifier 6.

On the other hand, the first vector regulator 7 receives a signal from the second output of the first divider 3 and adjusts its amplitude and phase. The first combiner 8 combines a signal from the second output of the second divider 5 and a signal from the first vector regulator 7. The first vector regulator 7 adjusts the amplitude and phase of the signal it receives, to produce an output equal in amplitude and opposite in phase to the signal components of the signal from the second output of the second divider 5. Thus, the first combiner 8 outputs only quantization noise components with the signal components cancelled out.

The second vector regulator 9 adjusts the amplitude and phase of the quantization noise components outputted from the first combiner 8. FIG. 6(*c*) shows a power spectrum of a signal at point C in FIG. 4, i.e., at an output of the second vector regulator 9. In FIG. 6(*c*), the horizontal axis represents frequency (MHz) while the vertical axis represents power (dBm). As can be seen from FIG. 6(*c*), the signal at point C consists of only the quantization noise components with signal components cancelled out. The auxiliary amplifier 10 amplifies the quantization noise components outputted from the second vector regulator 9. FIG. 6(*e*) shows a power spectrum of a signal at point E in FIG. 4, i.e., at an output of the auxiliary amplifier 10. Compared to the power spectrum in FIG. 6(*c*), the power spectrum in FIG. 6(*e*) shows increased power due to the amplification by the auxiliary amplifier 10.

The second combiner 11 combines a signal from an output of the main amplifier 6 and a signal from an output of the auxiliary amplifier 10. The second vector regulator 9 adjusts the amplitude and phase of its input signal so that a signal from an output of the auxiliary amplifier 10 and a signal from an output of the main amplifier 6 will be equal in amplitude and opposite in phase at the frequency of the quantization noise components. Thus, the second combiner 11 outputs a signal containing only signal components with the quantization noise components cancelled out. FIG. 6(*f*) shows a power spectrum of a signal at point F in FIG. 4, i.e., at the output of the second combiner 11. It can be seen that out of the signal contained in FIG. 6(*d*), only the signal components are distributed in FIG. 6(*f*) with the quantization noise components cancelled out.

Although it has been explained that the transmitting circuit device 1 according to the second embodiment has no bandpass filter installed on the side of the output terminal 12, a bandpass filter may be installed between the output terminal 12 and second combiner 11.

Figure 16:
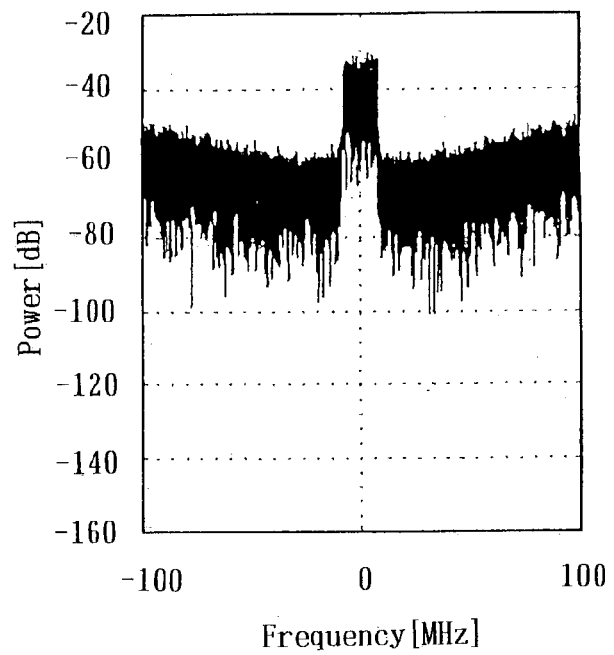
FIG. 16 is a diagram showing a power spectrum of a delta-sigma modulated signal.

Also, as shown in FIG. 6(*a*), the larger frequency detuning in a frequency domain becomes, the larger the power of the delta-sigma modulated signal becomes. FIG. 16 shows a power spectrum of the signal outputted from the delta sigma modulator 4 with the horizontal axis representing frequency in a range between −100 MHz and +100 MHz around a center frequency. The figure shows large power spectrum over a wide range in the frequency domain as is the case with FIG. 6(*a*).

In this way, since the signal outputted from the delta sigma modulator 4 shows large power over a wide range in the frequency domain, the signal inputted in the auxiliary amplifier 10 also shows large power over a wide range in the frequency domain. The electric power fed to the auxiliary amplifier 10 is large by this, thus resulting in large power consumption. To solve this problem, the output of the delta sigma modulator 4 can be band-limited by installing a band pass filter between the first combiner 8 and second vector regulator 9 or between the second vector regulator 9 and auxiliary amplifier 10. This decreases the electric power fed to the auxiliary amplifier 10, and thus reduces power consumption as well as quantization noise in the vicinity.

Figure 17:
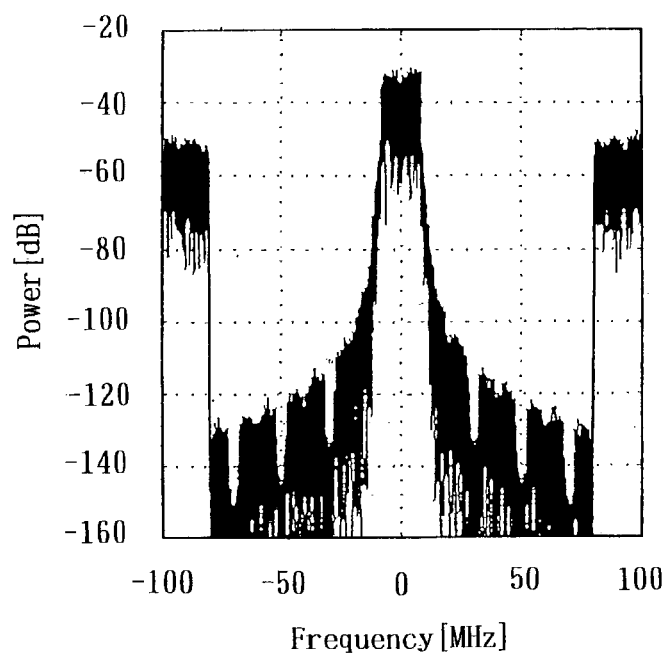
FIG. 17 is a signal obtained by combining a delta-sigma modulated signal and band-limited quantization noise signal.

FIG. 17 shows a power spectrum of an output signal from the second combiner 11, obtained with a band pass filter installed between the first combiner 8 and second vector regulator 9. The cut-off frequency of the band pass filter installed between the first combiner 8 and second vector regulator 9 is 80 MHz. FIG. 17 shows a power spectrum of the signal outputted from the second combiner 11 with the horizontal axis representing frequency difference from a center frequency in a range between −100 MHz and +100 MHz. It can be seen from FIG. 17 that power is increased at frequencies 80 MHz or more lower than the center frequency. It can also be seen that power is increased at frequencies 80 MHz or more higher than the center frequency.

In the region 80 MHz or more lower than the center frequency and the region 80 MHz or more higher than the center frequency, the signal power can be reduced by installing a bandpass filter on the output side of the second combiner 11. The band pass filter installed on the output side of the second combiner 11 does not need to have steep attenuation characteristics because it only has to attenuate signal power at frequencies sufficiently far from the center frequency.

By installing a band pass filter somewhere between the delta sigma modulator 4 and auxiliary amplifier 10 in this way, it is possible to further reduce power consumption.

Thus, the transmitting circuit device 1 according to this embodiment can output a signal from the output terminal 12 after canceling out the quantization noise produced during delta sigma modulation by the delta sigma modulator 4. Also, the transmitting circuit device 1 can reduce the quantization noise sufficiently without using a bandpass filter. Even when a bandpass filter is used to further reduce the quantization noise, there is no need for the bandpass filter to have steep characteristics because the circuit configuration of the present invention is sufficient to remove the quantization noise near the carrier. Thus, the transmitting circuit device 1 according to this embodiment can achieve size reduction compared to when a bandpass filter with steep characteristics is used and can achieve high efficiency even when a bandpass filter is used because it can reduce losses due to the bandpass filter.

Although it has been explained that the transmitting circuit device 1 in FIG. 4 performs analog signal processing, it is also possible to implement the same functions as in FIG. 4 using digital signal processing. The transmitting circuit device 1*a* in FIG. 5 implements the same functions as the transmitting circuit device 1 in FIG. 4 using digital signal processing. Incidentally, FIG. 1 is a conceptual block diagram of the transmitting circuit device 1*a* shown in FIG. 5.

Figure 5:
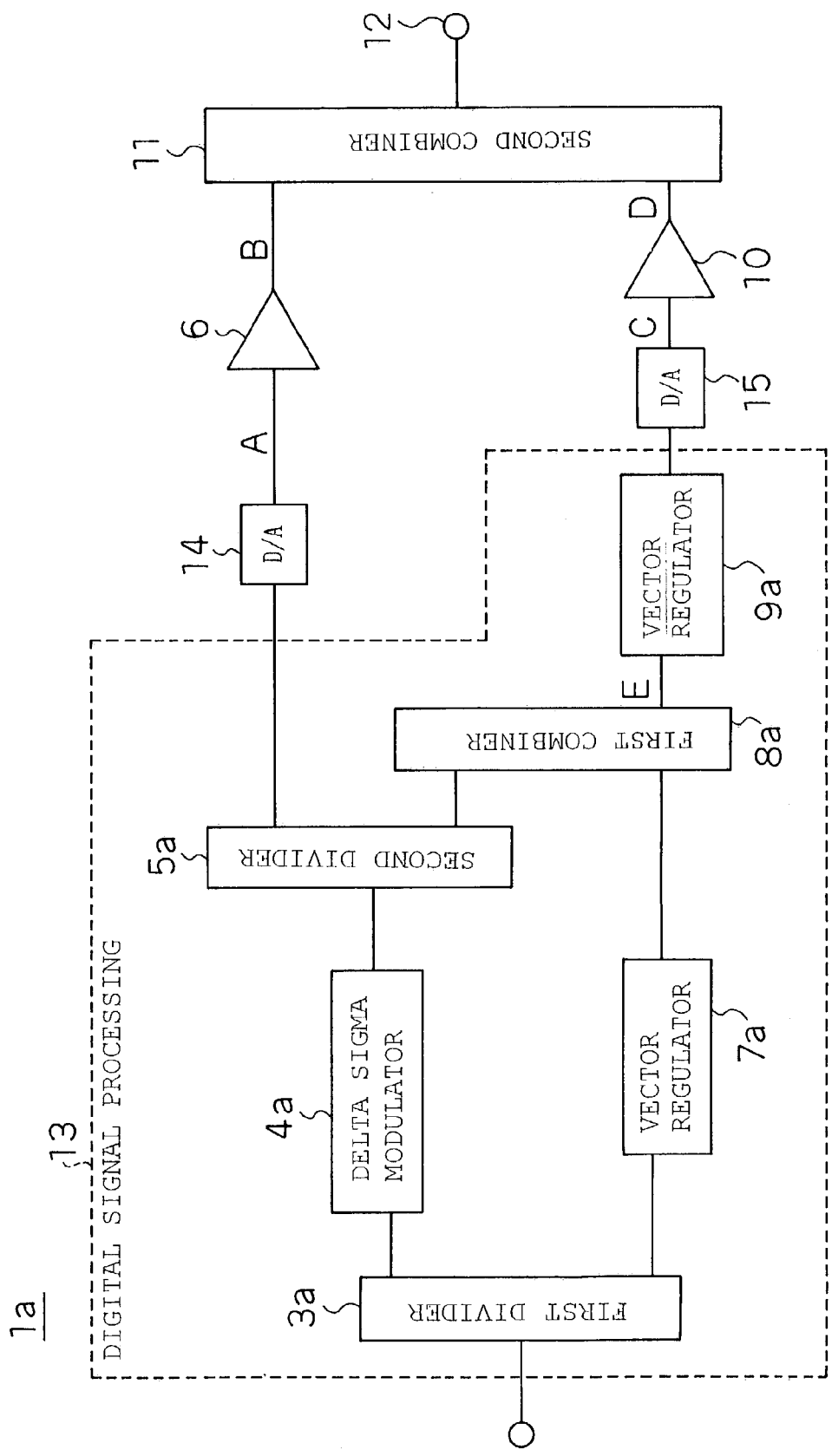
FIG. 5 is a block diagram of a transmitting circuit device which can implement functions equivalent to those of the transmitting circuit device according to the second embodiment of the present invention, using digital signal processing.

A digital signal processor 13 in FIG. 5 is configured as a digital signal processing circuit. Outside the digital signal processing 13, analog signal processing is performed by an analog signal processing circuit. FIG. 5 is a block diagram of the digital signal processor 13. Algorithms based on mathematical formulas may be used.

A signal inputted in a first divider 3a is a digital signal. It is inputted in the first divider 3a via a bus line consisting of a signal line which transmits at least a clock signal and two or more signal lines which transmit respective binary digital signals in synchronization with the clock signal. Also, signals processed in the digital signal processor 13 are transmitted via a similar bus line and undergo digital signal processing.

Output of a delta sigma modulator 4a is a digital signal which has a lower vertical resolution, i.e., a smaller number of available values than input of the delta sigma modulator 4a.

D/A converters 14 and 15 are circuits which convert digital signals on the bus line into analog signals.

The delta sigma modulator 4a, a second divider 5a, a vector regulator 7a, a first combiner 8a, and a vector regulator 9a are digital signal processing circuits which perform digital signal processing on the digital signals transmitted on the bus line.

The transmitting circuit device 1a shown in FIG. 5, in which circuits for analog signal processing occupy a smaller portion than in the transmitting circuit device 1, is smaller in circuit scale and easier to adjust than the transmitting circuit device 1 of FIG. 4.

When removing signal components in the first combiner 8a, output of the D/A converter 15 is monitored and the vector regulator 7a is operated using the results of monitoring. Also, to facilitate combination in the second combiner 11, the output terminal 12 is monitored and the vector regulator 9a is operated.

To facilitate combination in the second combiner 11, etc. of the transmitting circuit device 1a in FIG. 5, gains of the main amplifier 6 and auxiliary amplifier 10 can be determined as follows.

First, operation of the transmitting circuit device 1a will be described, including operation of computational algorithms for the digital signal processing 13 in FIG. 5.

Outside the digital signal processing 13, analog signal processing is performed by an analog signal processing circuit. Actually, the digital signal processing 13 is performed by a digital signal processing circuit using algorithms based on mathematical formulas, but FIG. 5 shows a circuit block in an analog fashion to help understand operation of the digital signal processing circuit.

The first divider 3a divides an input signal transmitted via the bus line in two.

A signal from the first output of the first divider 3a is delta-sigma modulated by the delta sigma modulator 4a, converted into a signal which has a lower vertical resolution, i.e., a smaller number of available values than the signal from the first output of the first divider 3a, input in the second divider 5a, and divided in two. On the other hand, the second output of the first divider 3a has its amplitude and phase adjusted by the vector regulator 7a and is input in the first combiner 8a.

The first combiner 8a combines a signal from the second output of the second divider 5a and a signal from the output of the vector regulator 7a and outputs the resulting signal to the vector regulator 9a.

The vector regulator 9a adjusts the amplitude and phase of the signal from the output of the first combiner 8a and outputs the resulting signal to the D/A converter 15.

The D/A converter 15 converts the signal from the output of the vector regulator 9a into an analog signal, which is then amplified by the auxiliary amplifier 10 and input in the second combiner 11.

A signal from the first output of the second divider 5a is input in the D/A converter 14, converted into an analog signal by the D/A converter 14, and output to the main amplifier 6.

The main amplifier 6 amplifies the analog signal received from the D/A converter 14 and outputs it to the second combiner 11.

The second combiner 11 combines the signal from the output of the main amplifier 6 and signal from the output of the auxiliary amplifier 10 and outputs the resulting signal.

When received by the first combiner 8a, the signal from the second output of the second divider 5a contains signal components as well as quantization noise components produced when the signal components are quantized. On the other hand, the signal from the output of the vector regulator 7a contains only the signal components. These signals have been adjusted to be equal in amplitude and opposite in phase when inputted in the first combiner 8a. Thus, the first combiner 8a outputs a signal containing only the quantization noise components.

Since the quantization noise components in the signal from the output of the main amplifier 6 and signal from the output of the auxiliary amplifier 10 have been adjusted to be equal in amplitude and opposite in phase when inputted in the second combiner 11, the second combiner 11 outputs a signal containing only the signal components to the output terminal 12 with the quantization noise components cancelled out.

If the signals received by the main amplifier 6 and auxiliary amplifier 10 are binary, switching elements can be used as the main amplifier 6 and auxiliary amplifier 10, which further increases efficiency.

Next, a concrete description will be provided using a mathematical formula.

Namely, if X(t) denotes the output signal from the vector regulator 7a and Y(t) denotes the signal delta-sigma modulated by the delta sigma modulator 4a, Formula 1 below holds.

$$Y(t)=X(t)+E(t) \qquad \text{[Formula 1]}$$

where E(t) is quantization noise.

The signal Y(t) is output from point A. A signal a1×Y(t) is output from point B, where a1 is a gain of the main amplifier 6. On the other hand, a signal a2×E(t) is output from point C, where a2 is a constant.

In order for the second combiner 11 to cancel out the quantization noise components, a1×E(t) must be output from point D. Thus, the gain of the auxiliary amplifier 10 can be set to a1/a2.

It is possible to install an A/D converter between the second output of the first divider 3a and vector regulator 7a, input analog signals in the first divider 3a, and make the A/D converter convert the analog signals outputted from the first divider 3a into digital signals. Alternatively, it is possible to install an A/D converter between the first output of the first divider 3a and delta sigma modulator 4a, input analog signals in the first divider 3a, and make the A/D converter convert the analog signals outputted from the first divider 3a into digital signals. It is also possible to install an A/D converter on the output side of the blocks composing the digital signal processor 13, input analog signals in the blocks, and make the A/D converter convert the analog signals into digital signals. In short, all that is necessary is to input the digital signals transmitted via the bus line into all or some of the digital signal processing 13 blocks and make all or some of the digital signal processing 13 blocks perform digital signal processing.

Figure 7:
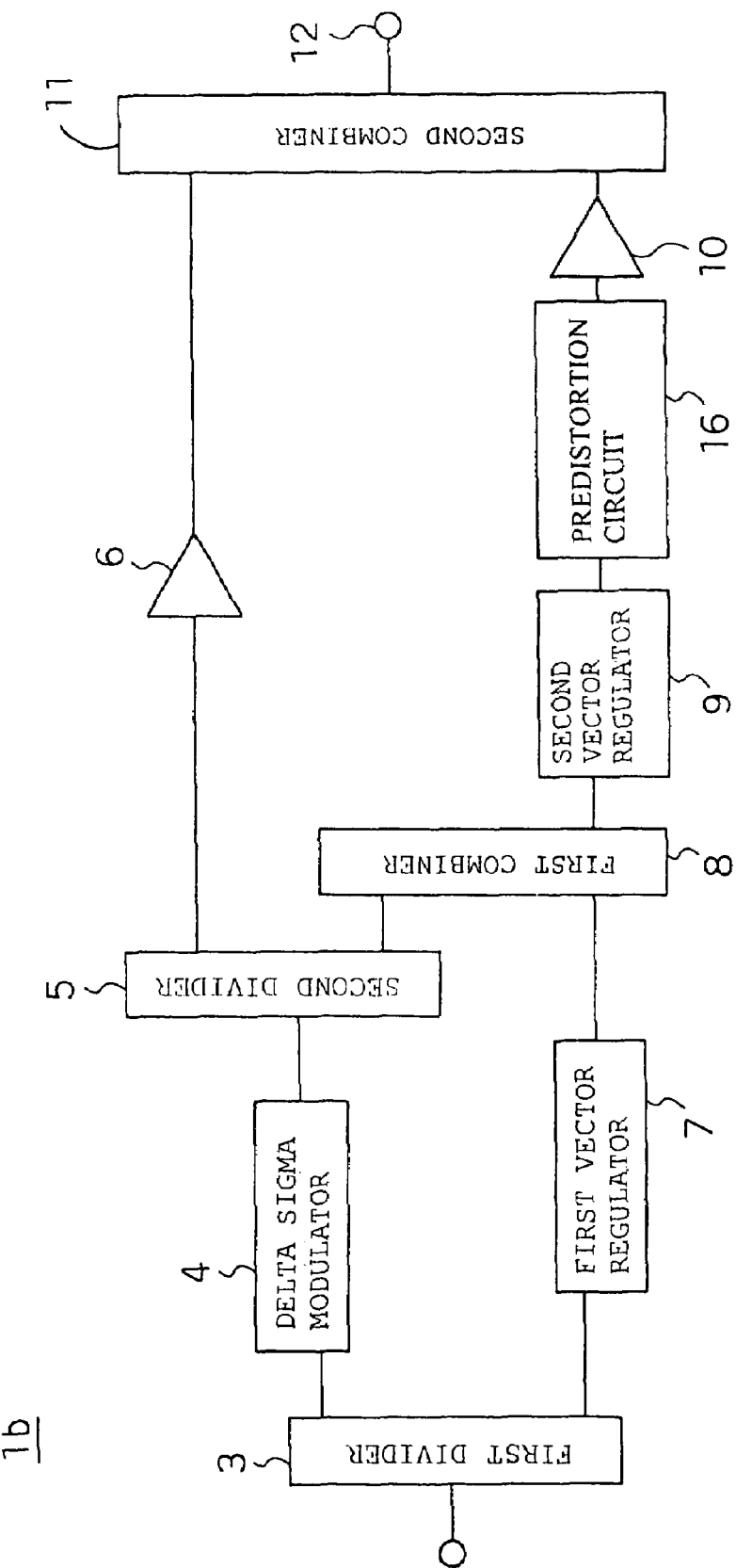
FIG. 7 is a block diagram of the transmitting circuit device according to the second embodiment of the present invention.

As shown in FIG. 7, by installing a predistortion circuit 16 between the auxiliary amplifier 10 and second vector regulator 9 of the transmitting circuit device 1 shown in FIG. 4, it is possible to improve distortion characteristics of the auxiliary amplifier 10, reduce the power consumption of the auxiliary amplifier, reduce the power consumption of the transmitting circuit as a whole, and thus provide a transmitting circuit device 1b which has good characteristics. Also, that part of the transmitting circuit device 1b in FIG. 7 which corresponds to the digital signal processing 13 of the transmitting circuit device 1a in FIG. 5 can be made to perform digital signal processing similar to the digital signal processing 13. In that case, the transmitting circuit device 1b in FIG. 7 can be made smaller in circuit scale and easier to adjust.

Next, a third embodiment will be described.

Figure 8:
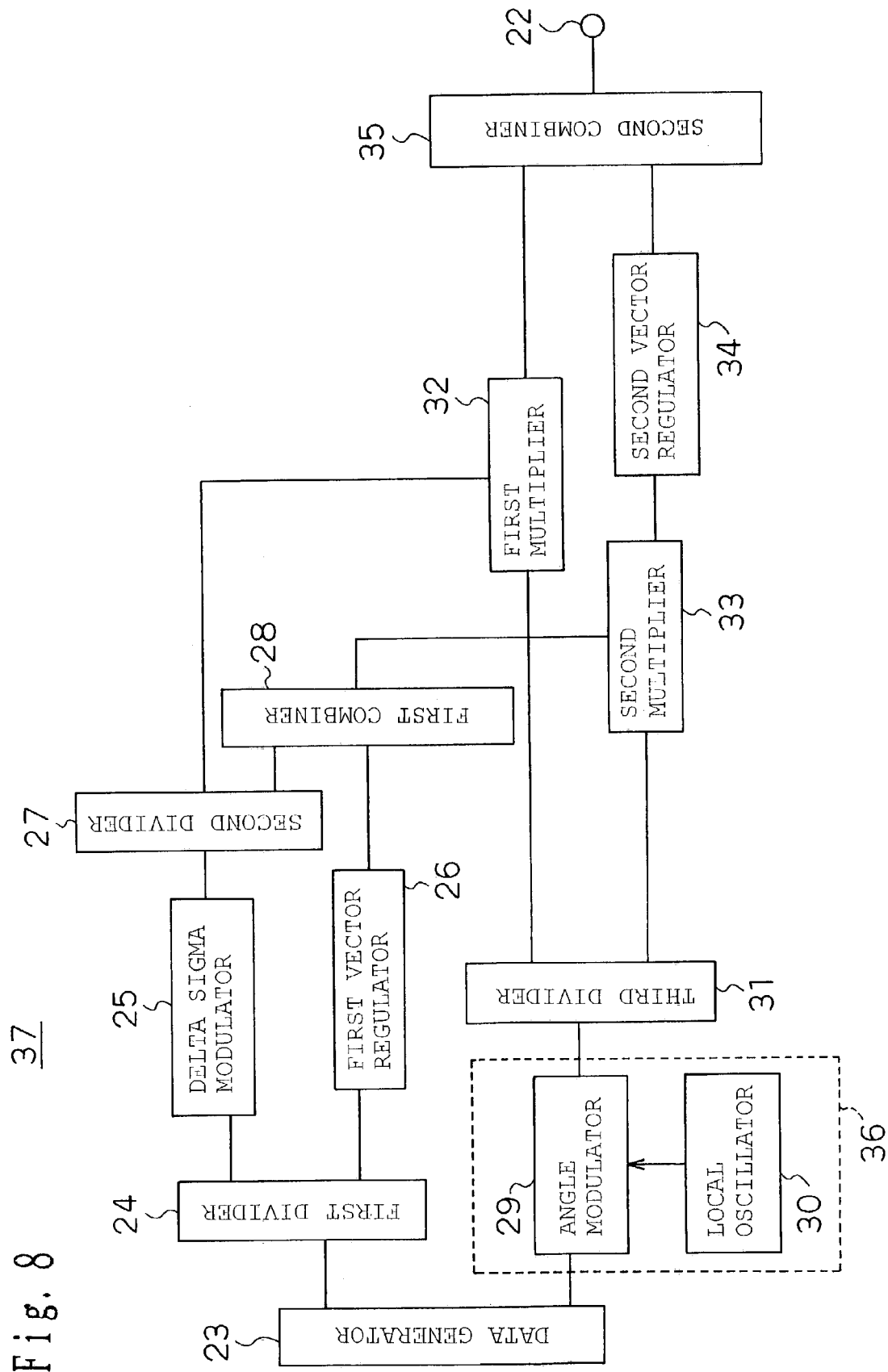
FIG. 8 is a block diagram of a transmitting circuit device according to a third embodiment of the present invention.

FIG. 8 shows a configuration of a transmitting circuit device 37 according to the third embodiment. The transmitting circuit device 37 according to this embodiment functions as a modulator and a power amplifier as well.

The transmitting circuit device 37 comprises a data generator 23, first divider 24, delta sigma modulator 25, first vector regulator 26, second divider 27, first combiner 28, angle-modulated signal source 36, angle modulator 29, local oscillator 30, third divider 31, first multiplier 32, second multiplier 33, second vector regulator 34, second combiner 35, and output terminal 22. The angle-modulated signal source 36 consists of the angle modulator 29 and local oscillator 30.

The data generator 23 is a circuit which generates amplitude modulation data and angle modulation data.

The first divider 24, second divider 27, and third divider 31 are circuits which divide an input signal in two.

The delta sigma modulator 25 is a circuit which lowers the vertical resolution of amplitude modulation data. For example, it converts 8-bit input data (data which can take 256 values) into 2-bit data (data which can take 4 values). In this way, the delta sigma modulator 25 reduces the number of values available to amplitude modulation data.

The first vector regulator 26 and second vector regulator 34 are circuits which adjust the amplitude and phase of input signals and consist of a variable attenuator and variable phase shifter.

The first combiner 28 and second combiner 35 are circuits which combine signals entering through two different ports and output the resulting signal.

The angle-modulated signal source 36 is a circuit which supplies an angle-modulated signal. Thus, the local oscillator 30 oscillates a carrier wave and the angle modulator 29 angle-modulates the oscillated carrier wave with the angle modulation data.

The first multiplier 32 and second multiplier 33 are circuits which multiply signals entering through two different ports. Such a circuit may be a dual-gate FET configured to enter an output of a delta sigma modulator in the first gate, and an angle-modulated wave in the second gate. Alternatively, an amplifier may be installed in a stage subsequent to the second multiplier 33.

Next, operation of this embodiment will be described.

The data generator 23 generates amplitude modulation data and angle modulation data.

The amplitude modulation data outputted from the data generator 23 is input in the first divider 24 and divided in two by the first divider 24. The amplitude modulation data from the first output of the first divider 24 is delta-sigma modulated by the delta sigma modulator 25 and outputted as digital data which has a lower vertical resolution, i.e., a smaller number of available values than the amplitude modulation data, or as discrete analog data.

The output signal is input in the second divider 27 and divided in two by the second divider 27.

On the other hand, the amplitude modulation data from the second output of the first divider 24 is input in the first vector regulator 26. The first vector regulator 26 adjusts the amplitude and phase of the amplitude modulation data. A signal from the first output of the second divider 27 and a signal from an output of the first vector regulator 26 are combined by the first combiner 28. The first vector regulator 26 adjusts the amplitude and phase of the received amplitude modulation data so that the received amplitude modulation data and the signal from the first output of the second divider 27 will be equal in amplitude and opposite in phase. Consequently, signal components in a signal from an output of the first combiner 28 are cancelled out and only quantization noise components attributable to quantization by the delta sigma modulator 25 are outputted. In the transmitting circuit device 37 according to this embodiment, components attributable to quantization are detected at the frequency of the amplitude modulation data which are lower than the frequencies of the output from the output terminal 22.

Besides, the local oscillator 30 oscillates a carrier wave which is a wave of a carrier frequency. The angle modulator 29 angle-modulates the carrier wave oscillated by the local oscillator 30, using angle modulation data received from the data generator 23. The signal which has been angle-modulated by the angle modulator 29 is divided in two by the third divider 31. The angle-modulated signal from the first output of the third divider 31 is multiplied by a signal from the second output of the second divider 27 by the first multiplier 32. Thus, the signal outputted from the first multiplier 32 has undergone angle modulation and amplitude modulation.

On the other hand, a signal from the second output of the third divider 31 is multiplied by the signal outputted from the first combiner 28 by the second multiplier 33. Thus, a signal outputted from the second multiplier 33 has been angle-modulated and then amplitude-modulated with the quantization noise components attributable to quantization. The second vector regulator 34 adjusts the amplitude and phase of the signal from the second multiplier 33.

The signal from the output of the first multiplier 32 and signal from the output of the second vector regulator 34 are combined by the second combiner 35. The second vector regulator 34 adjusts the amplitude and phase of the signal from the output of the second multiplier 33 to produce an output equal in amplitude and opposite in phase to the signal from the output of the first multiplier 32 in terms of the quantization noise components.

Specifically, the signal from the output of the first multiplier 32 has been angle-modulated with a signal containing the quantization noise components and signal components and then amplitude-modulated. On the other hand, the signal from the second vector regulator 34 has been angle-modulated and then amplitude-modulated with a signal containing only the quantization noise components. Consequently, the second combiner 35 outputs a signal containing only the signal components which have been angle-modulated with signal components and then amplitude-modulated. In other words, the signal components which have been angle-modulated with the quantization noise components and then amplitude-modulated have been removed from the output of the second combiner 35.

Thus, a signal from which components attributable to quantization noise components have been removed can be obtained from the output terminal 22.

If the first multiplier 32 or second multiplier 33 consists of a mixer and amplifier, it can also function as an angle modulator and a power amplifier as described above. Furthermore, since a signal which has been angle-modulated with quantization noise components and then amplitude-modulated can be cancelled out without using a bandpass filter, a high-efficiency, small-sized transmitting circuit device can be implemented.

The larger frequency detuning width becomes, the larger the power of the signal inputted in the second multiplier 33 as in the case of the second embodiment described with reference to FIG. 16. Thus, if signals are band-limit by installing a low pass filter between the second divider 27 and first combiner 28 or between the first combiner 28 and second multiplier 33, it is possible to decrease the power of the signals inputted in the second multiplier 33, and thus reduce power consumption. In that case, unnecessary frequency components can be reduced by installing a band pass filter on the output side of the second combiner 35. Incidentally, the band pass filter installed on the output side of the second combiner 35 does not need to have steep characteristics for the reasons stated in relation to the second embodiment.

In this way, by installing a low pass filter between the first combiner 28 and second multiplier 33, it is possible to further reduce power consumption.

Figure 9:
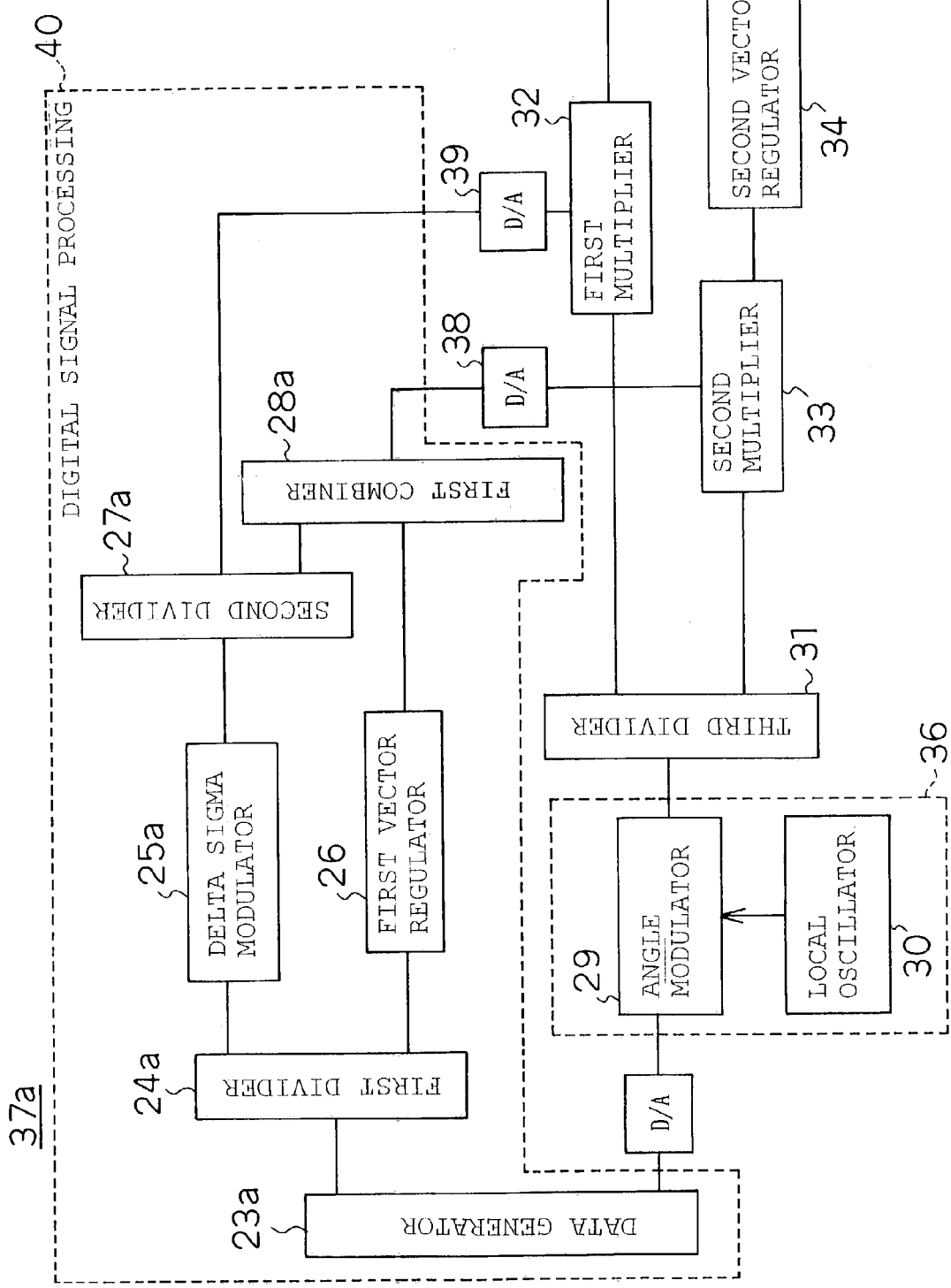
FIG. 9 is a block diagram of a transmitting circuit device which can implement functions equivalent to those of the transmitting circuit device according to the third embodiment of the present invention, using digital signal processing.

FIG. 9 shows a transmitting circuit device 37a which implements functions equivalent to those of the transmitting circuit device 37 by means of digital signal processing. In other words, the digital signal processing 40 portion of the transmitting circuit device 37a implements the functions of the transmitting circuit device 37 in FIG. 8 by means of digital signal processing. Also, a D/A converter 38 and D/A converter 39 convert digital data outputted from the digital signal processing 40 and transmitted on a bus line into analog signals.

Figure 21:
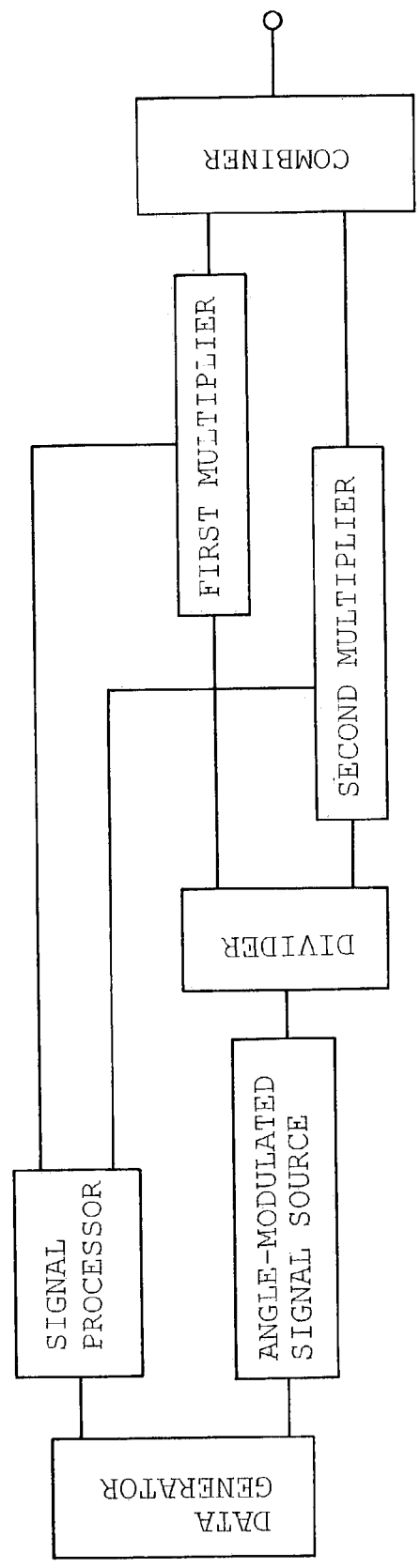
FIG. 21 is a diagram conceptually showing a configuration of the transmitting circuit device 37 according to the third embodiment of the present invention.

FIG. 21 shows a conceptual diagram of the transmitting circuit device 37 shown in FIG. 9. A signal processor in FIG. 21 corresponds to the first divider 24, delta sigma modulator 25, second divider 27, first vector regulator 26, and first combiner 28.

The signal processor in FIG. 21 is a circuit which produces amplitude data with low vertical resolution from a first output and produces quantization noise signals from a second output.

The signal processor in FIG. 21 produces amplitude data x1(t) with low vertical resolution from the first output and produces a quantization noise signal from the second output. As the second output, the signal processor produces x2(t) determined from x2(t)=x1(t)−x0(t), where x0(t) is the original amplitude data.

Figure 22:
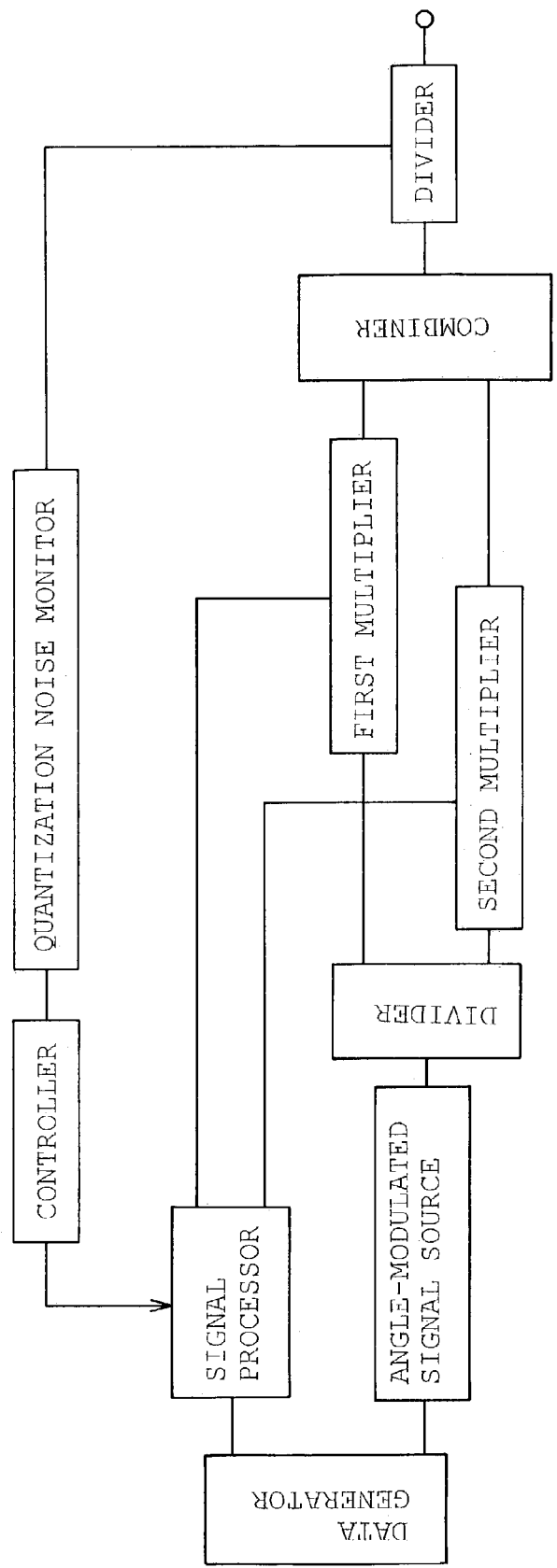
FIG. 22 is a diagram showing a control method used by a signal processor according to the third embodiment of the present invention.
Figure 23:
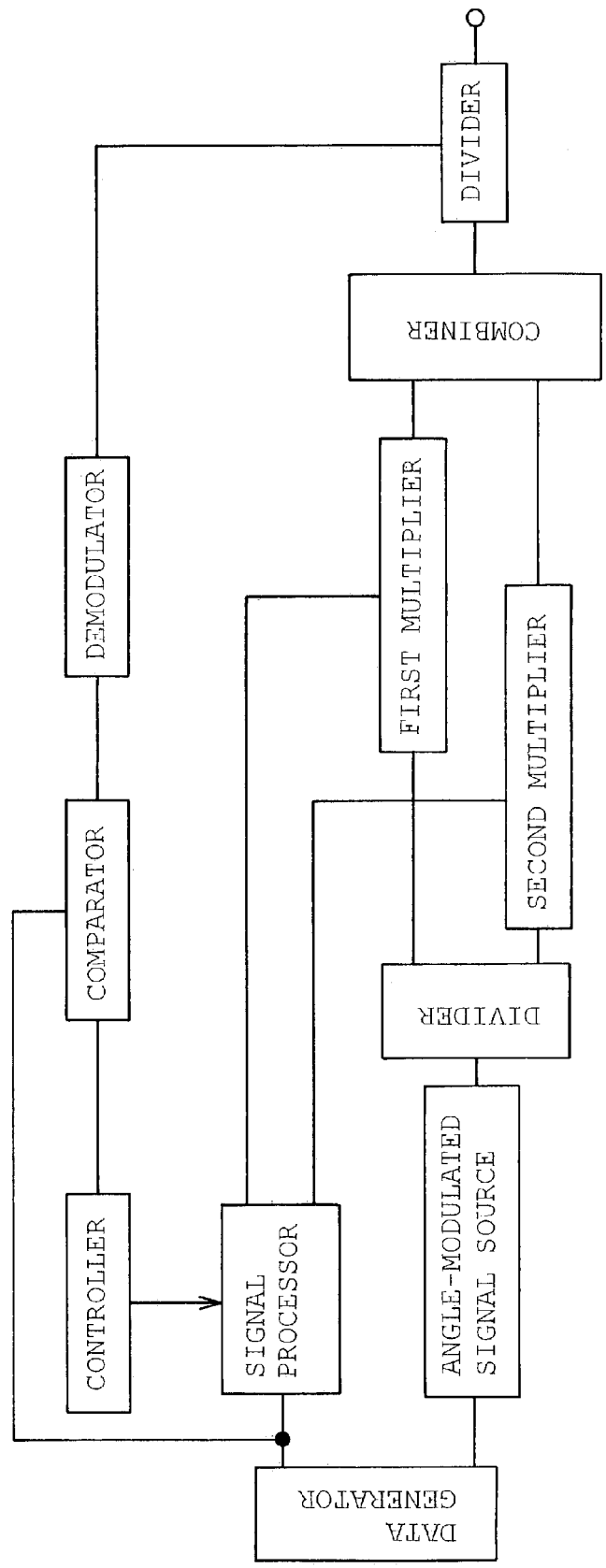
FIG. 23 is a diagram showing a control method used by the signal processor according to the third embodiment of the present invention.

The signal processor can suppress quantization noise in a stable and effective manner using control methods shown in FIGS. 22 and 23. Incidentally, the control method shown in FIG. 22 is similar to the control method in FIG. 19 described in relation to the first embodiment while the control method shown in FIG. 23 is similar to the control method in FIG. 20 described in relation to the first embodiment, and thus detailed description thereof will be omitted. A comparator shown in FIG. 23 compares an original amplitude signal with a demodulated amplitude signal. Alternatively, it is possible to perform control in such a way as to minimize difference between an original vector signal inputted in the comparator and a vector signal outputted from a demodulator.

Since the transmitting circuit device 37a in FIG. 9 has a smaller number of analog signal processing circuits than the transmitting circuit device 37 in FIG. 8, it can be made small in size and simple in structure.

When the transmitting circuit device 1 according to the second embodiment is used as a power amplifier at a transmit frequency, digital data which is delta-sigma modulated by the delta sigma modulator 25 has a very high frequency. If the transmit frequency is in the 1-GHz band, for example, the clock frequency of the delta sigma modulator 25 in the transmitting circuit device 1 according to the second embodiment will be somewhere around 4 GHz, for example. The use of such a very high transmit frequency makes it difficult to produce the delta sigma modulator 25 or results in increased power consumption.

This problem can be avoided by using a configuration in which the amplitude data outputted from the data generator 23 is delta-sigma modulated by the delta sigma modulator 25, as is the case with the transmitting circuit device 37 in FIG. 8. Specifically, the delta sigma modulator 25 of the transmitting circuit device 37 can avoid the problem by delta-sigma modulating amplitude modulation data lower in frequency than the transmit frequency rather than delta-sigma modulating the transmit frequency. Therefore, even if a very high transmit frequency such as a 1-GHz band frequency is used, the delta sigma modulator 25 can be produced easily and low-distortion signals at the transmit frequency can be output through the output terminal 22.

Incidentally, although it has been explained that in the transmitting circuit device 37 according to this embodiment and the transmitting circuit device 37a, the first multiplier 32 and second combiner 35 are connected directly, this is not restrictive. A power amplifier may be connected between the first multiplier 32 and second combiner 35.

Figure 24:
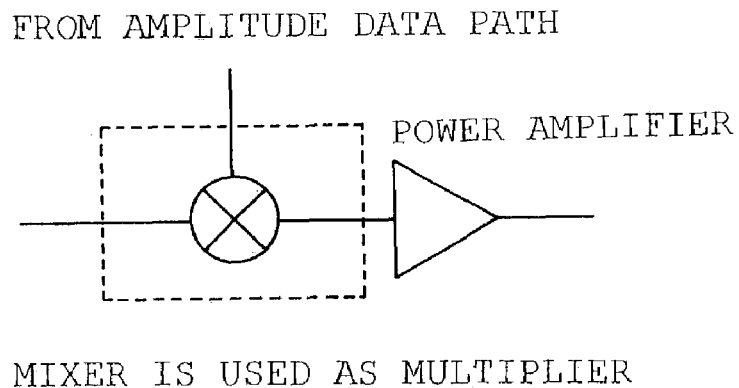
FIG. 24 is a diagram showing a configuration of a multiplier according to the third embodiment of the present invention.
Figure 25:
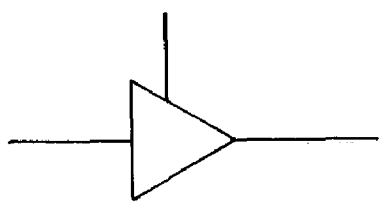
FIG. 25 is a diagram showing a configuration of a multiplier according to the third embodiment of the present invention.
Figure 26:
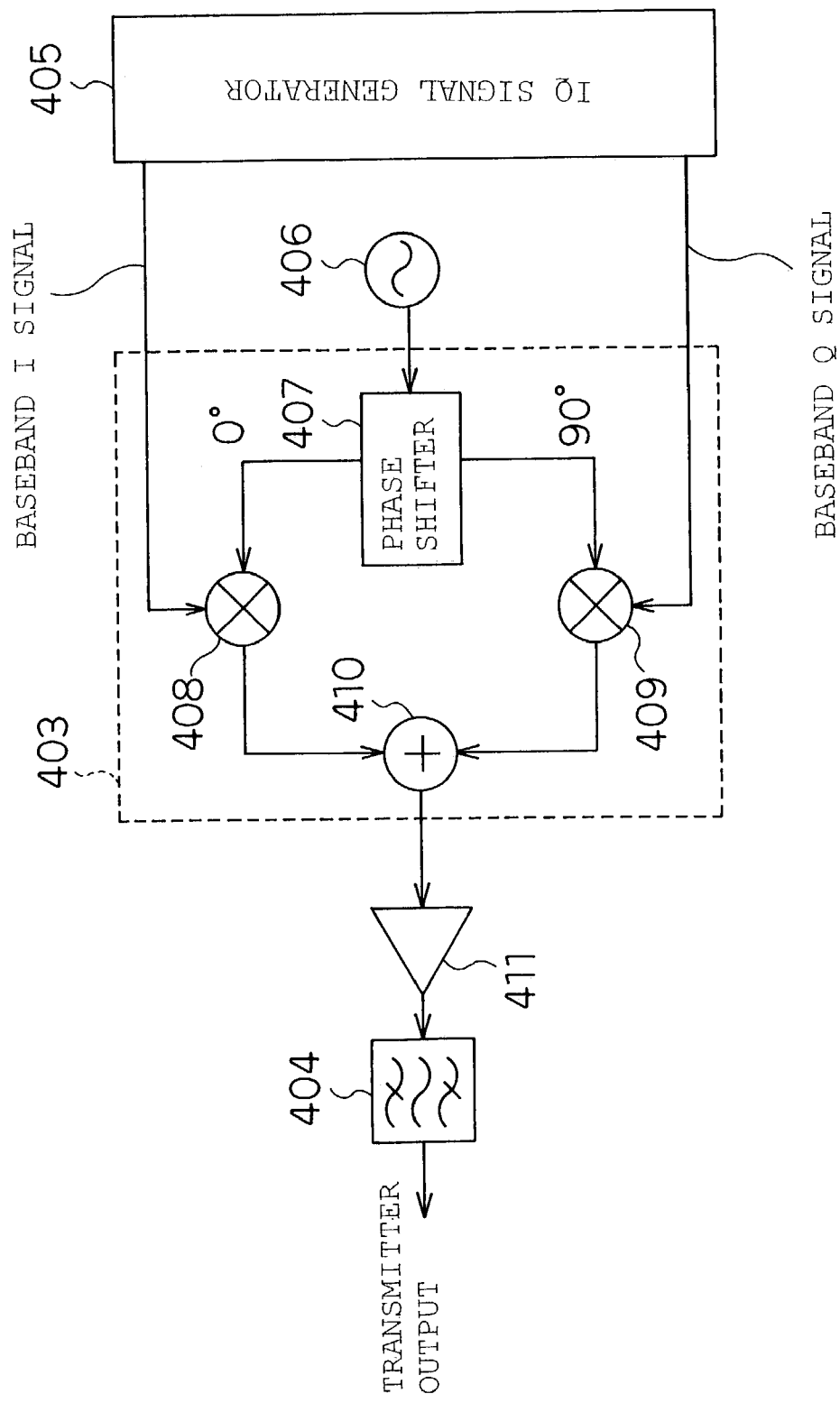
FIG. 26 is a diagram showing a basic configuration of a conventional transmitting circuit device.
Figure 27:
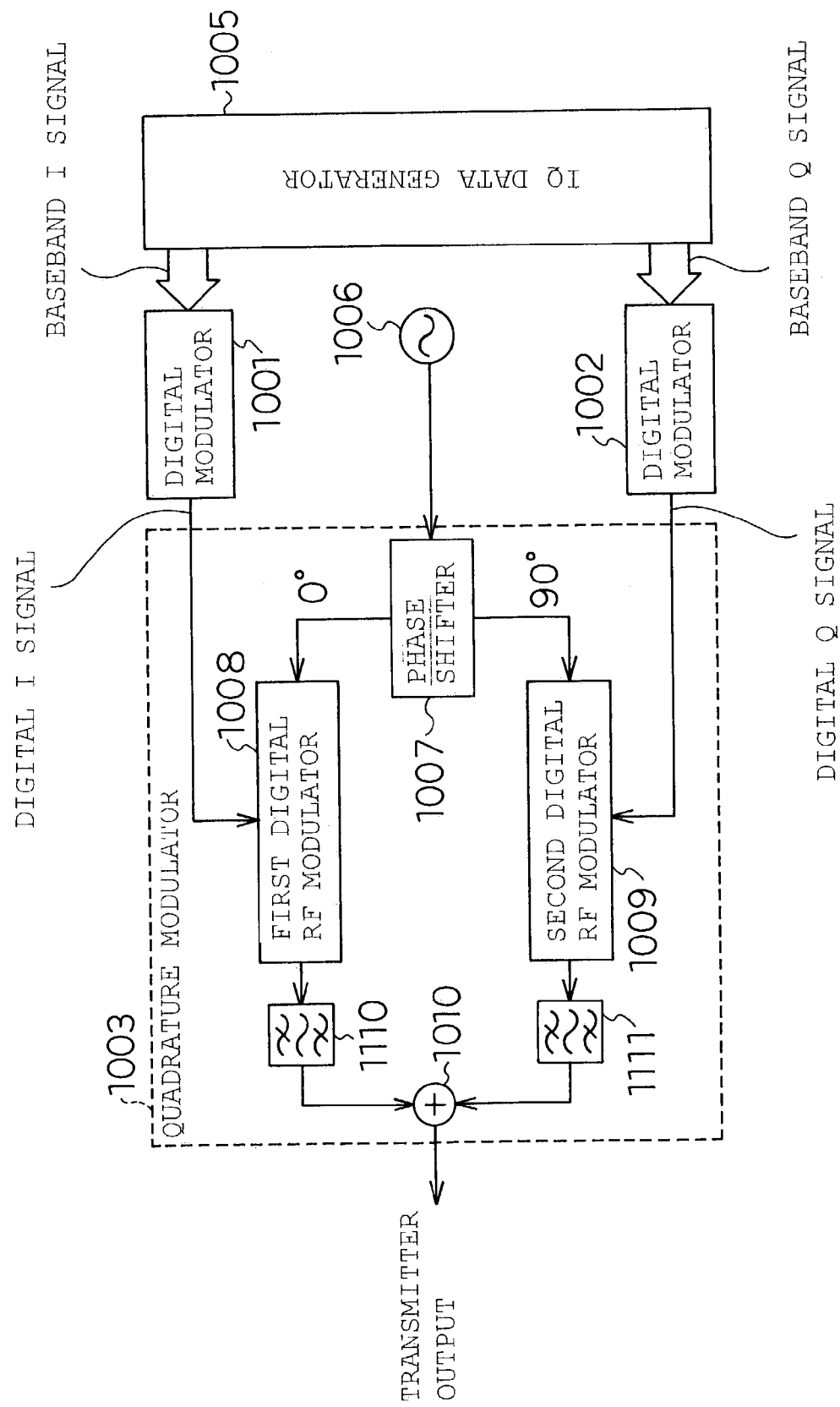
FIG. 27 is a diagram showing a basic configuration of a conventional transmitting circuit device.
Figure 28:
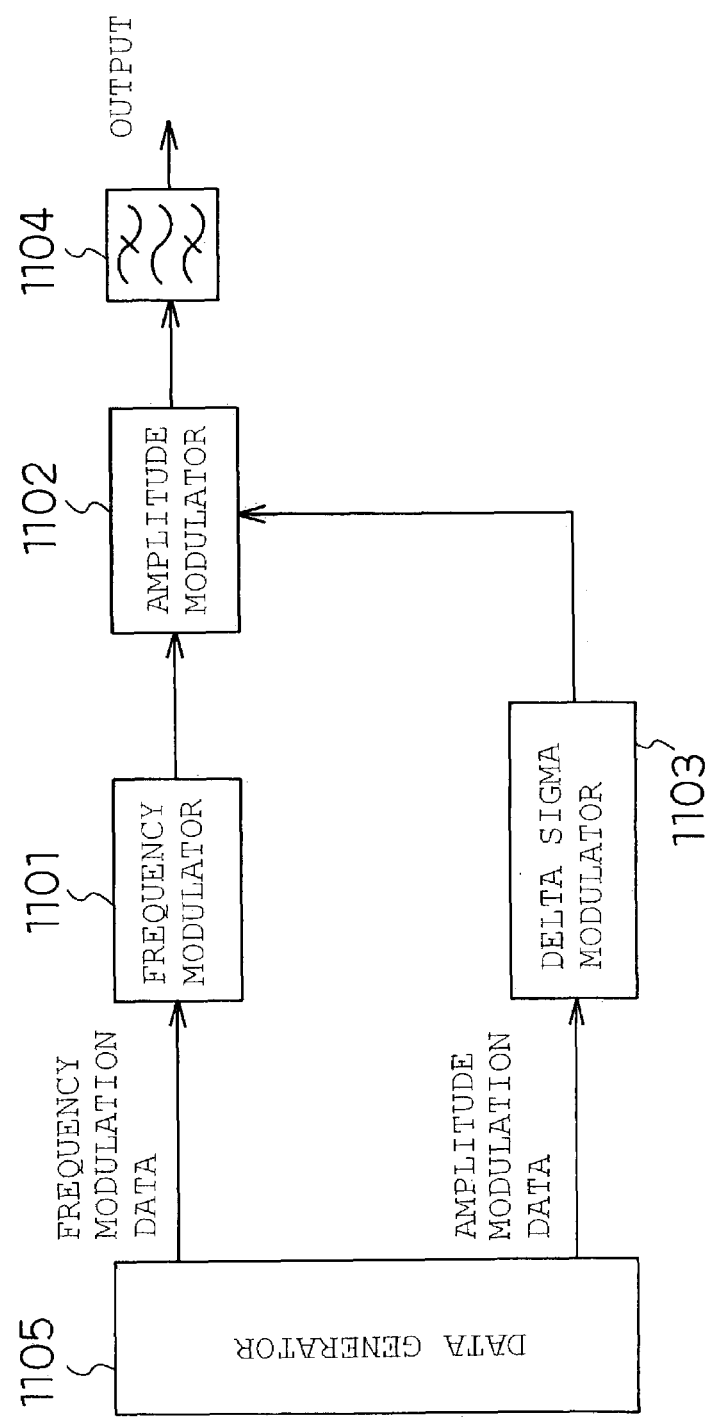
FIG. 28 is a diagram showing a basic configuration of a conventional transmitting circuit device.
Figure 30:
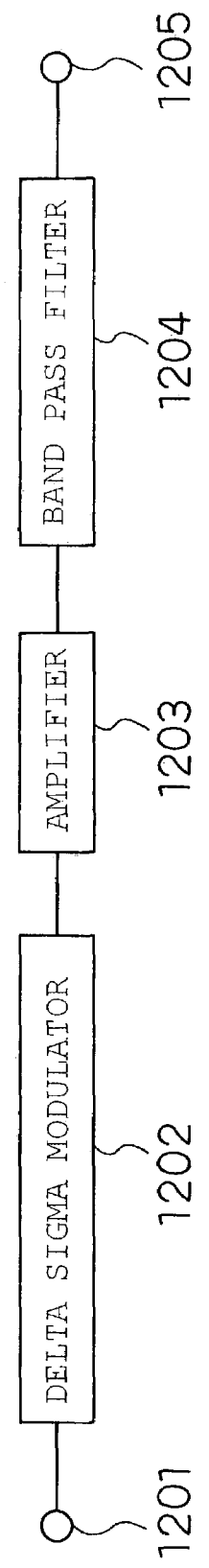
FIG. 30 is a diagram showing a basic configuration of a conventional transmitting circuit device.

Examples of multipliers are shown in FIGS. 24 and 25. These configurations make it possible to implement amplification capabilities together with multiplication capabilities. FIG. 24 shows a configuration in which a mixer is used as a multiplier and a power amplifier is installed in a stage subsequent to the mixer. FIG. 25 shows a configuration in which a high-power amplitude modulator is used. That is, a multiplier in FIG. 25 is implemented by controlling supply voltage of a power amplifier.

In this way, various modifications can be made to the transmitting circuit device 37 of this embodiment and depending on the modification, unique effects can be added to the transmitting circuit device 37 of this embodiment.

Furthermore, the angle modulator 29 may be a frequency modulator which frequency-modulates the carrier wave outputted from the data generator 23 using the frequency modulation data outputted from the local oscillator 30 or may be a phase modulator which phase-modulates the carrier wave outputted from the data generator 23 using the phase modulation data outputted from the local oscillator 30. The same is true of the angle modulators used in the following embodiments.

Next, a fourth embodiment will be described.

Figure 10:
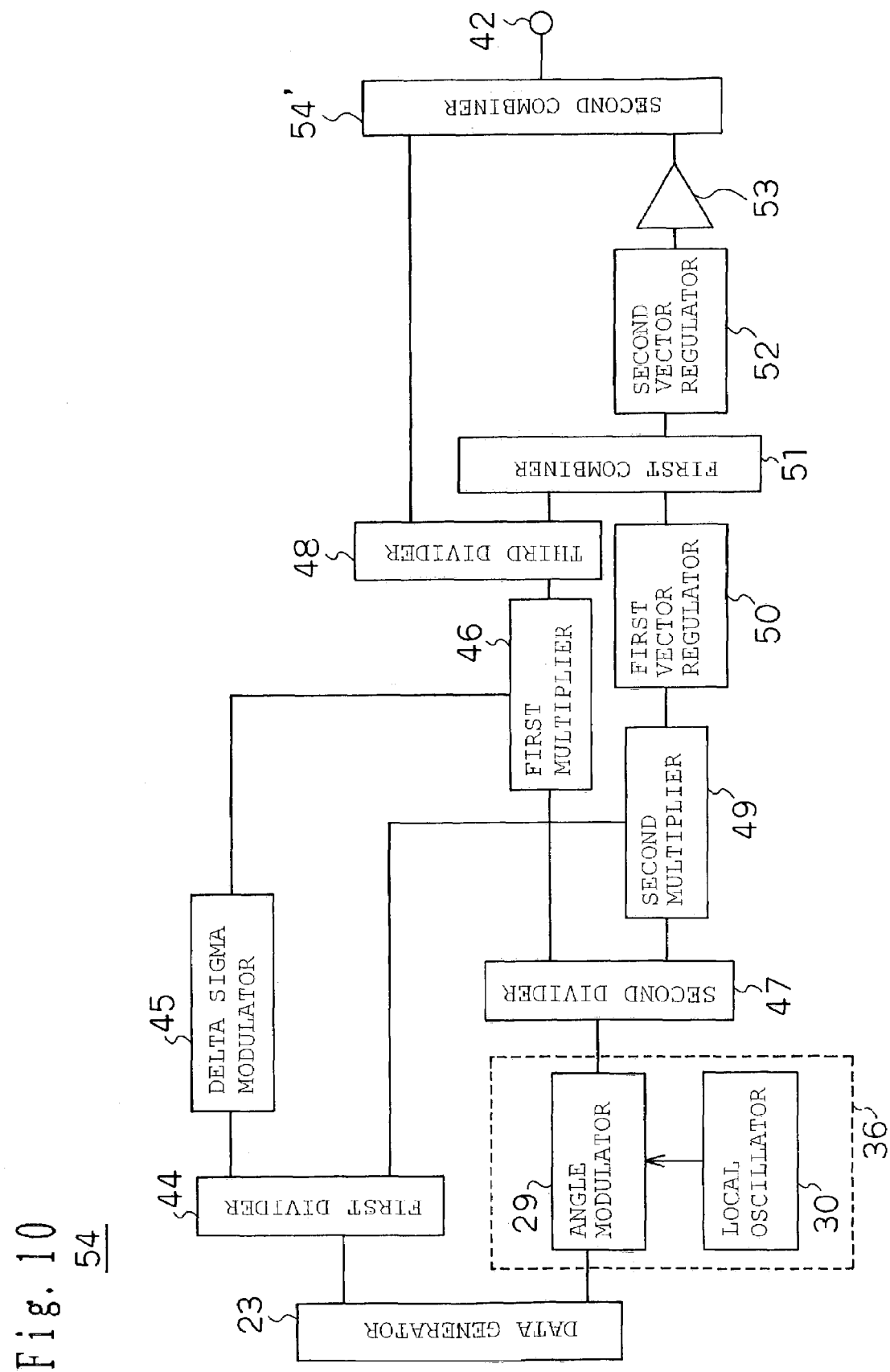
FIG. 10 is a block diagram of a transmitting circuit device according to a fourth embodiment of the present invention.

FIG. 10 shows a configuration of a transmitting circuit device 54 according to this embodiment. Unlike the transmitting circuit device 37 according to the third embodiment which detects components attributable to quantization in the frequency band of the amplitude modulation data, the transmitting circuit device 54 according to this embodiment detects the components in the frequency band of a transmit frequency.

Thus, the transmitting circuit device 54 according to this embodiment consists of a data generator 23, first divider 44, delta sigma modulator 45, first multiplier 46, angle-modulated signal source 36, second divider 47, third divider 48, second multiplier 49, first vector regulator 50, first combiner 51, second vector regulator 52, auxiliary amplifier 53, and second combiner 54'.

The data generator 23 generates amplitude modulation data and angle modulation data as in the case of the third embodiment.

The first divider 44, second divider 47, and third divider 48 divide an input signal in two.

The delta sigma modulator 45 converts amplitude modulation data into digital data which has a lower vertical resolution, i.e., a smaller number of available values than the amplitude modulation data, and then into discrete analog data.

The angle-modulated signal source 36 outputs a signal obtained by angle-modulating a carrier wave with angle modulation data as in the case of the third embodiment.

The first multiplier 46 and second multiplier 49 multiply signals entering through two ports. Such a circuit may be a circuit consisting, for example, of a mixer and power amplifier.

The first vector regulator 50 and second vector regulator 52 adjust the amplitude and phase of input signals.

The first combiner 51 and second combiner 54' combine signals entering through two ports and output the resulting signal.

The auxiliary amplifier 53 amplifies input signals.

Incidentally, an amplifier may be installed between the third divider 48 and second combiner 54'.

Next, operation of this embodiment will be described.

The data generator 23 generates amplitude modulation data and angle modulation data as in the case of the third embodiment. The first divider 44 divides the amplitude modulation data outputted by the data generator 23 in two.

The amplitude modulation data from the first output of the first divider 44 is delta-sigma modulated by the delta sigma modulator 45.

On the other hand, the angle-modulated signal source 36 outputs an angle-modulated signal as in the case of the third embodiment. The angle-modulated signal is divided in two by the second divider 47. The first multiplier 46 multiplies the angle-modulated signal from the first output of the second divider 47 and a signal from the delta sigma modulator 45. In other words, the first multiplier 46 amplitude-modulates the angle-modulated signal with the output signal from the delta sigma modulator 45. The signal obtained by the multiplication is divided in two by the third divider 48.

The second multiplier 49 multiplies the angle-modulated signal from the second output of the second divider 47 and the amplitude modulation data from the second output of the first divider 44. In other words, the second multiplier 49 amplitude-modulates the angle-modulated signal with the amplitude modulation data. The signal obtained by the multiplication has its amplitude and phase adjusted by the first vector regulator 50.

The first combiner 51 combines a signal from the first output of the third divider 48 and a signal from an output of the first vector regulator 50.

The signal inputted in the first vector regulator 50 has been angle-modulated and then amplitude-modulated with the amplitude modulation data. The first vector regulator 50 adjusts the amplitude and phase of this signal to produce an output equal in amplitude and opposite in phase to the signal from the first output of the third divider 48. Thus, the first combiner 51 outputs only the signal which has been angle-modulated with quantization noise components and then amplitude-modulated. The signal which have been angle-modulated with signal components and then amplitude-modulated is cancelled out.

The second vector regulator 52 adjusts the amplitude and phase of the signal outputted from the first combiner 51. A signal from an output of the second vector regulator 52 is amplified by the auxiliary amplifier 53. The second combiner 54' combines a signal from the second output of the third divider 48 and a signal from an output of the auxiliary amplifier 53 and outputs the resulting signal to an output terminal 42.

The signal from the second output of the third divider 48 has been angle-modulated and then amplitude-modulated with digital data containing both signal components and quantization noise components. On the other hand, the signal from the output of the auxiliary amplifier 53 has been angle-modulated with the components attributable to quantization and then amplitude-modulated. To make the two signals equal in amplitude and opposite in phase, the second vector regulator 52 adjusts the amplitude and phase of the signal from the output of the first combiner 51. Thus, in the second combiner 54', the signal which has been amplitude-modulated with the quantization noise components is cancelled out. The second combiner 54' outputs a signal with reduced quantization noise components.

Thus, a carrier-frequency signal with reduced quantization noise components can be obtained from the output terminal 42.

Incidentally, although it has been explained that in the transmitting circuit device 54 according to this embodiment, the third divider 48 and second combiner 54' are connected directly, this is not restrictive. A power amplifier may be connected between the third divider 48 and second combiner 54'.

As is the case with the second and third embodiments, it is possible to reduce power consumption by installing a bandpass filter between the first combiner 51 and second vector regulator 52 or between the second vector regulator 52 and auxiliary amplifier 53. In that case, a bandpass filter should be installed on the output side of the second combiner 54' to reduce unnecessary frequency components.

Incidentally, effects of the fourth embodiment and variations other than those above are similar to those of the third embodiment, and thus description thereof will be omitted.

Next, a fifth embodiment will be described.

Figure 11:
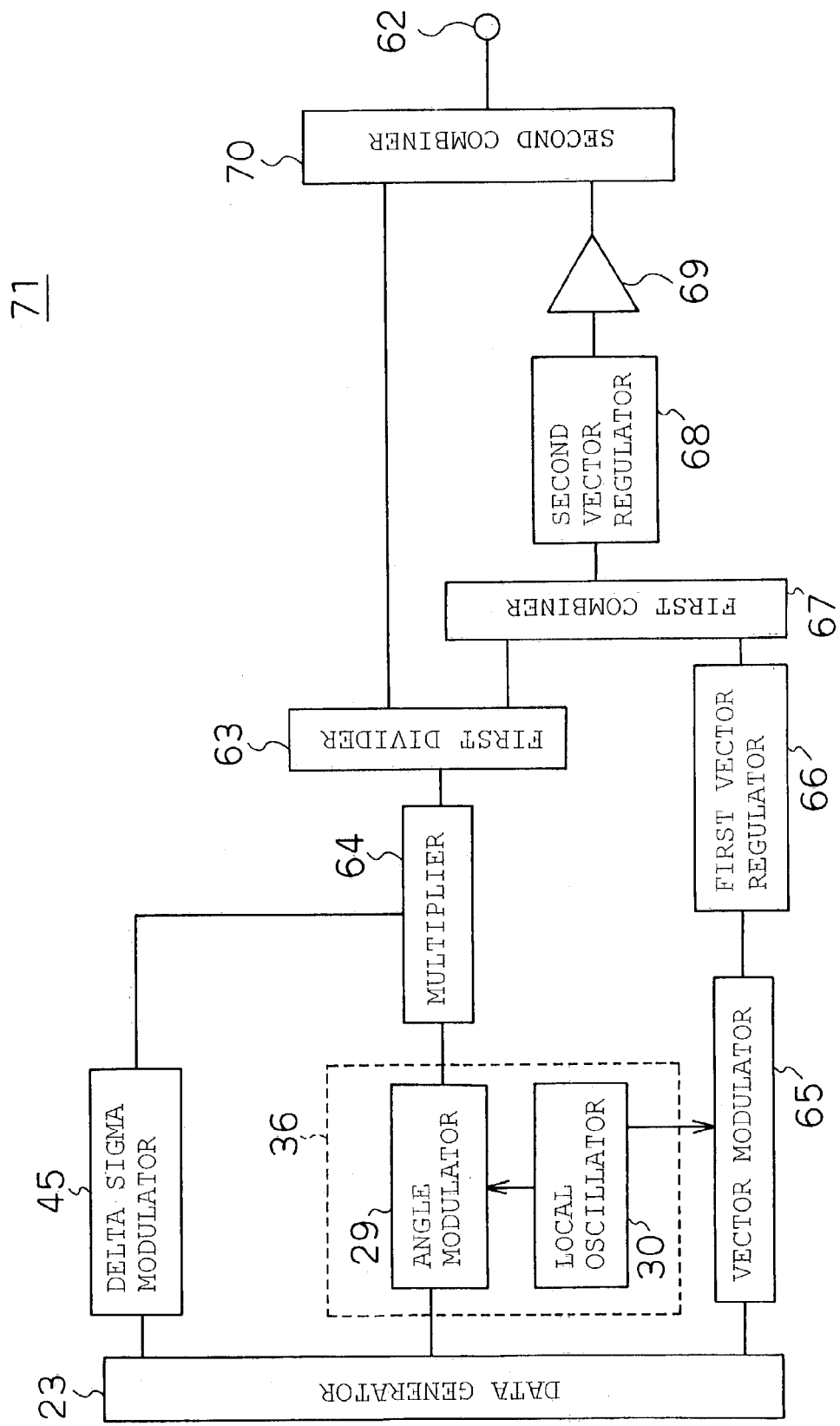
FIG. 11 is a block diagram of a transmitting circuit device according to a fifth embodiment of the present invention.

FIG. 11 shows a configuration of a transmitting circuit device 71 according to the fifth embodiment.

The transmitting circuit device 71 according to the fifth embodiment consists of a data generator 23, delta sigma modulator 45, first divider 63, angle-modulated signal source 36, multiplier 64, vector modulator 65, first vector regulator 66, first combiner 67, second vector regulator 68, auxiliary amplifier 69, second combiner 70, and output terminal 62.

The data generator 23, delta sigma modulator 45, and angle-modulated signal source 36 are the same as those of the fourth embodiment.

The first divider 63 divides an input signal in two and outputs the resulting signals.

The multiplier 64 multiplies signals entering through two ports.

The vector modulator 65 vector-modulates carrier waves with vector signals. The vector modulator 65 used here may be a quadrature modulator which quadrature-modulates carrier waves with a baseband I signal and baseband Q signal or a polar modulator which polar-modulates carrier waves with an amplitude signal and phase signal. The fifth embodiment will be described citing a case in which a quadrature modulator is used as the vector modulator 65.

The first vector regulator 66 and second vector regulator 68 adjust the amplitude and phase of input signals.

The first combiner 67 and second combiner 70 combine signals entering through two ports and output the resulting signal.

The auxiliary amplifier 69 amplifies input signals.

Incidentally, an amplifier may be installed between the first divider 63 and second combiner 70.

Next, operation of this embodiment will be described.

The data generator 23 outputs amplitude modulation data, angle modulation data, and baseband IQ signals.

The delta sigma modulator 45 delta-sigma modulates the amplitude modulation data and outputs a discrete analog signal, which is then input in the multiplier 64.

The amplitude modulation data outputted from the data generator 23 is input in the angle-modulated signal source 36, which angle-modulates a carrier wave with the amplitude modulation data and outputs the resulting signal to the multiplier 64.

The multiplier 64 multiplies the signal outputted from the delta sigma modulator 45 and the signal outputted from the angle-modulated signal source 36.

The baseband IQ signals outputted from the data generator 23 are input in the vector modulator 65, which quadrature-modulates carrier frequency with the baseband IQ signals. Incidentally, the carrier wave inputted in the modulator 65 is supplied from the local oscillator 30 of the angle-modulated signal source 36. The first vector regulator 66 adjusts the amplitude and phase of the quadrature-modulated signal outputted from the vector modulator 65.

The first combiner 67 combines a signal from the second output of the first divider 63 and a signal from the first vector regulator 66. The signal from the multiplier 64 has been angle-modulated and then amplitude-modulated with a signal containing both signal components and quantization noise components (attributable to quantization). The signal from the output of the first vector regulator 66 has been quadrature-modulated. The first vector regulator 66 adjusts the amplitude and phase of the signal from an output of the vector modulator 65 to produce an output equal in amplitude and opposite in phase to the signal at the output of the multiplier 64. Thus, the first combiner 67 cancels out the signal which has been angle-modulated and then amplitude-modulated with the signal components and outputs only the signal which has been amplitude-modulated with the quantization noise components attributable to quantization.

The signal outputted from the first combiner 67 is input in the second vector regulator 68, where it has its amplitude and phase adjusted. Then, it is amplified by the auxiliary amplifier 69.

The second combiner 70 combines a signal from the first output of the first divider 63 and a signal from an output of the auxiliary amplifier 69. The signal from the first output of the first divider 63 has been angle-modulated and then amplitude-modulated with a signal containing signal components and components attributable to quantization. The signal from an output of the auxiliary amplifier 69 has been angle-modulated and then amplitude-modulated with the components attributable to quantization. The second vector regulator 68 adjusts the amplitude and phase of the signal from the output of the first combiner 67 so that the signal at the first output of the first divider 63 and the signal at the output of the auxiliary amplifier 69 will be equal in amplitude and opposite in phase. Thus, the second combiner 70 cancels out the signal which has been angle-modulated and then amplitude-modulated with the components attributable to quantization and outputs only the signal which has been amplitude-modulated with the signal components. This makes it possible to obtain a signal with good distortion characteristics from the output terminal 62.

In this way, the transmitting circuit device 71 according to this embodiment can output signals with good distortion characteristics without using a bandpass filter, as is the case with the other embodiments described above.

Also, by using a circuit consisting of a mixer and power amplifier as the multiplier 64, the transmitting circuit device 71 can combine the functions of a modulator and power amplifier. Moreover, a bandpass filter is either unnecessary or does not need to have steep characteristics if ever used. This makes it possible to implement a high-efficiency, small-sized transmitting circuit device. Besides, the use of semiconductor circuits, which can be implemented in chip form, will allow the device to be made smaller than with a large filter.

Needless to say, the transmitting circuit device 71 according to this embodiment can be based on digital signal processing, as in the case of the transmitting circuit devices according to the other embodiments described above.

Furthermore, if a power amplifier is installed between the multiplier 64 and second combiner 70, an even higher-power, higher-efficiency transmitting circuit device can be implemented.

Besides, although the fifth embodiment has been described citing a case in which a quadrature modulator is used as the vector modulator 65, a polar modulator may be used as the vector modulator 65. In that case, instead of baseband IQ signals, an amplitude signal and phase signal should be output from the data generator 23.

Furthermore, to reduce power consumption, the signals outputted from the delta sigma modulator 45 can be band-limited by installing a low pass filter between the delta sigma modulator 45 and multiplier 64. In that case, a band pass filter should be installed on the output side of the second combiner 70 to reduce unnecessary frequency components.

Next, a sixth embodiment will be described.

Figure 12:
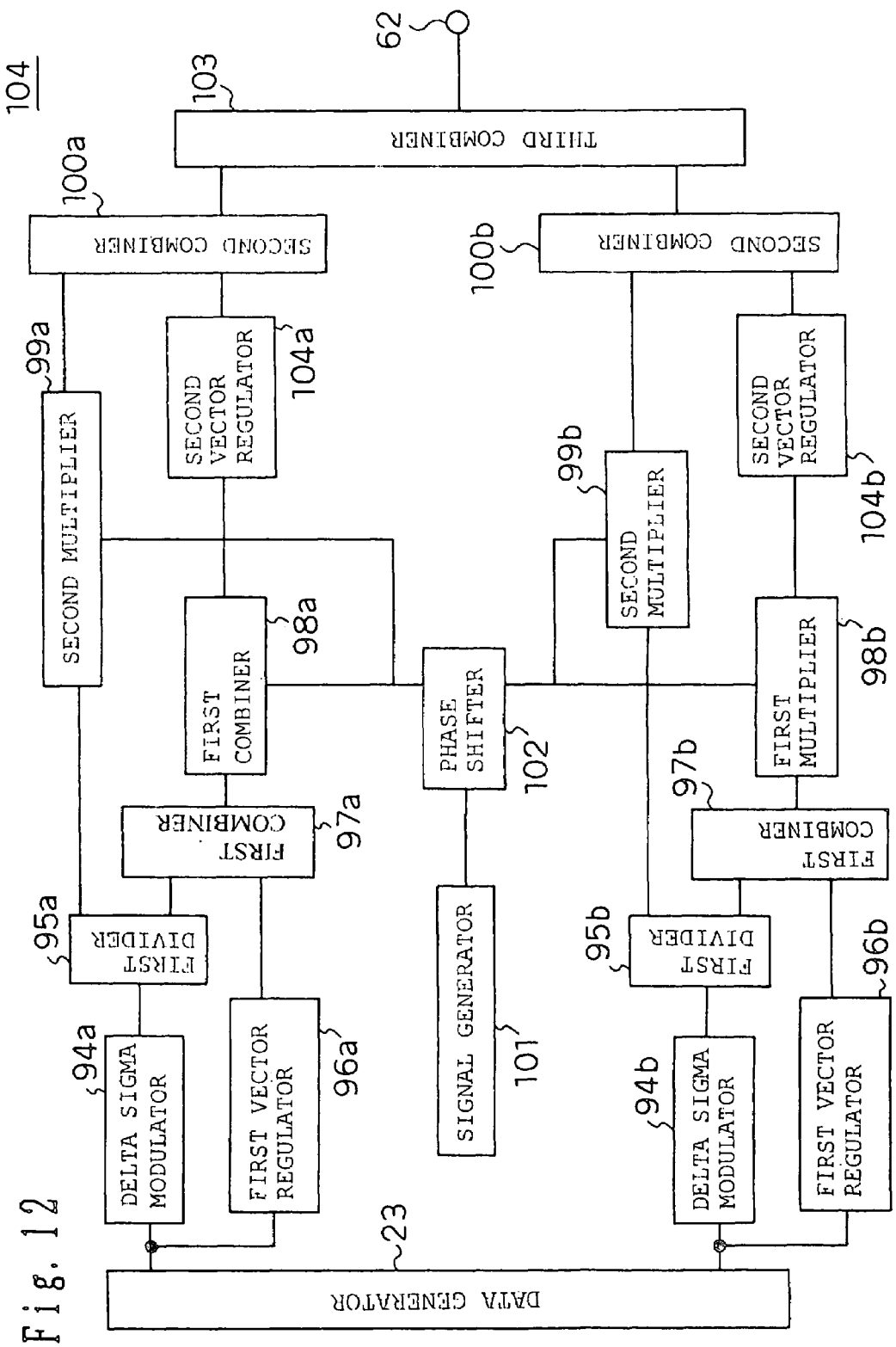
FIG. 12 is a block diagram of a transmitting circuit device according to a sixth embodiment of the present invention.

FIG. 12 shows a configuration of a transmitting circuit device 104 according to the sixth embodiment.

The transmitting circuit device 104 according to the sixth embodiment comprises a data generator 23, delta sigma modulators 94a and 94b, first dividers 95a and 95b, first vector regulators 96a and 96b, first combiners 97a and 97b, first multipliers 98a and 98b, second vector regulators 104a and 104b, second multipliers 99a and 99b, second combiners 100a, and 100b, a third combiner 103, and an output terminal 62.

The data generator 23 is a circuit which outputs a baseband I signal and baseband Q signal.

The delta sigma modulators 94a and 94b delta-sigma modulate the baseband I signal and baseband Q signal.

The first dividers 95a and 95b divide an input signal in two and outputs the resulting signals.

The first vector regulators 96a and 96b as well as second vector regulators 104a and 104b adjust the amplitude and phase of input signals.

The first combiners 97a and 97b, second combiners 100a and 100b, and third combiner 103 are circuits each of which combines signals entering through two ports and outputs the resulting signal.

The first multipliers 98a and 98b as well as second multipliers 99a and 99b are circuits each of which multiplies signals entering through two different ports.

A signal generator 101 is a circuit which generates carrier waves.

A phase shifter 102 shifts the phases of carrier waves. It phase-shifts two outputs whose phases are 90 degrees apart from each other.

Next, operation of this embodiment will be described.

Incoming voice signals and the like enter the data generator 23, which then outputs a baseband I signal and baseband Q signal.

The baseband T signal is divided in two by a divider (not shown) and inputted in the delta sigma modulator 94a and the first vector regulator 96a. The signal inputted in the delta sigma modulator 94a is delta-sigma modulated by it and inputted in the first divider 95a, where it is divided in two.

On the other hand, the baseband I signal inputted in the first vector regulator 96a has its amplitude and phase adjusted. The first combiner 97a combines a signal from the first output of the first divider 95a and the baseband I signal from an output of the first vector regulator 96a. Since the signal from the first output of the first divider 95a is a delta-sigma modulated baseband I signal, it contains a signal component, which is the baseband I signal, and quantization noise components produced by quantization. The first vector regulator 96a adjusts the amplitude and phase of the baseband I signal it receives, to produce an output equal in amplitude and opposite in phase to the signal from the first output of the first divider 95a. Thus, the first combiner 97a cancels out the signal component which is the baseband I signal and outputs only the quantization noise components attributable to quantization.

The first multiplier 98a multiplies the carrier wave generated by the signal generator 101 and the signal outputted from the first combiner 97a. Thus, the signal outputted from the first multiplier 98a is the signal obtained by amplitude-modulating the carrier wave with the quantization noise components.

On the other hand, the signal from the second output of the first divider 95a is input in the second multiplier 99a, which is also fed the carrier wave generated by the signal generator 101. The second multiplier 99a multiplies the signal from the first divider 95a and the carrier wave from the signal generator 101. Thus, the signal outputted from the second multiplier 99a is the signal obtained by amplitude-modulating the carrier wave with a signal containing the signal component, which is the baseband I signal, and the quantization noise components produced by quantization.

The second combiner 100a combines the signal from the second multiplier 99a and signal from the first multiplier 98a.

The signal from the output of the second multiplier 99a is the signal obtained by amplitude-modulating the carrier wave with a signal containing the signal component, which is the baseband I signal, and the quantization noise components. The signal from the output of the first multiplier 98a is the signal obtained by amplitude-modulating the carrier wave with the quantization noise components which are produced when the I signal is delta-sigma modulated. The second vector regulator 104a adjusts the amplitude and phase of the signal it receives, to produce an output equal in amplitude and opposite in phase to the signal from the output of the second multiplier 99a. Thus, the second combiner 100a cancels out the component obtained by amplitude-modulating the carrier wave with the quantization noise components and outputs only the signal obtained by amplitude-modulating the carrier wave with the signal component which is the baseband I signal.

The above operation similarly applies to the baseband Q signal. The second combiner 100b outputs only the signal obtained by amplitude-modulating the carrier wave with the signal component which is the baseband Q signal.

The signal outputted from the second combiner 100a and the signal outputted from the second combiner 100b are combined by the third combiner 103 and outputted through the output terminal.

In this way, the transmitting circuit device 104 according to this embodiment can output signals with good distortion characteristics without using a bandpass filter, as is the case with the other embodiments described above.

Also, by using circuits each consisting of a mixer and power amplifier as the second multipliers 99a and 99b, the transmitting circuit device 104 can combine the functions of a modulator and power amplifier. Moreover, a bandpass filter is either unnecessary or does not need to have steep characteristics if ever used. This makes it possible to implement a high-efficiency, small-sized transmitting circuit device. Besides, the use of digital signal processing or IC chips in the stages up to the multipliers will allow size reduction.

Needless to say, the transmitting circuit device 104 according to this embodiment can be based on digital signal processing, as in the case of the transmitting circuit devices according to the other embodiments described above.

Furthermore, a power amplifier may be installed between the second multiplier 99a and the second combiner 100a as well as between the second multiplier 99b and the second combiner 100b.

Incidentally, in the above embodiment, a predistortion circuit may be installed before the multipliers while a predistortion circuit and an amplifier may be installed after the vector regulators.

Also, to reduce power consumption, the signals outputted from the delta sigma modulators 94a and 94b can be band-limited by installing a low pass filter between the first combiner 97a and first multiplier 98a as well as between the first combiner 97b and first multiplier 98b. In that case, a band pass filter should be installed on the output side of the third combiner 103 to reduce unnecessary frequency components.

Figure 13:
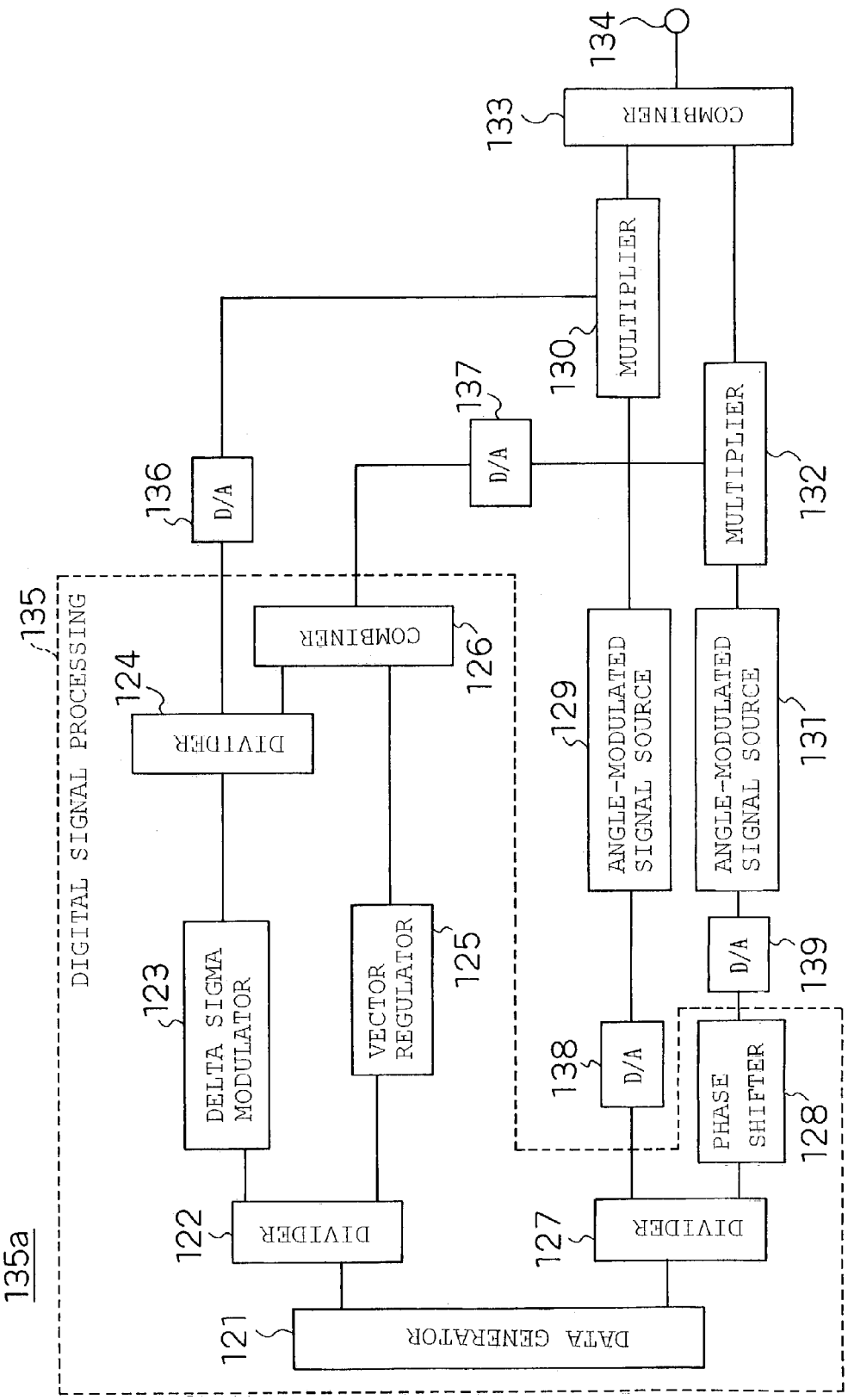
FIG. 13 is a block diagram of a transmitting circuit device according to another embodiment of the present invention.

FIG. 13 shows another embodiment. A digital signal processing 135 portion is similar to the transmitting circuit device 37 in FIG. 9, but differs in that a signal is divided by a divider 127 and that one of signals has its phase rotated by a phase shifter 128.

An output of the divider 127 is converted into an analog signal by a D/A converter 138 and inputted in an angle-modulated signal source 129. On the other hand, an output of the phase shifter 128 is converted into an analog signal by a D/A converter 139 and inputted in an angle-modulated signal source 131. The angle-modulated signal sources 129 and 131 are circuits which angle-modulate incoming signals and output them.

An output of a divider 124 is converted into an analog signal by a D/A converter 136. The output of the D/A converter 136 and output of the angle-modulated signal source 129 are input in a multiplier 130. On the other hand, an output of a combiner 126 is converted into an analog signal by a D/A converter 137. Then, the output of the D/A converter 137 and output of the angle-modulated signal source 131 are input in a multiplier 132. Outputs of the multipliers 130 and 132 are combined by a combiner 133 and outputted through an output terminal 134.

With this configuration, this embodiment has the following advantages.

Since the transmitting circuit device 135*a* in FIG. 13 has a small number of analog signal processing circuits, it can be made smaller in circuit scale and easier to adjust.

A wireless communications device, comprising a transmitting circuit which outputs transmit signals; and a receive circuit which receives receive signals, wherein any of the transmitting circuit devices according to the present invention is used for the transmitting circuit also belongs to the present invention.

As described above, the present invention can provide a transmitting circuit device and wireless communications device which are small in size and high in efficiency.

What is claimed is:

1. A transmitting circuit device, comprising:
a first signal source which outputs a first signal that is a binary or multilevel discrete analog signal or an analog signal with a binary or multilevel discrete envelope and that has signal components and quantization noise components;
a second signal source which outputs a second signal composed of the quantization noise components;
a first amplifier which amplifies the first signal;
a combiner which cancels out the quantization noise components by combining an output of the first amplifier and the second signal;
a signal processor which performs signal processing on incoming third vector data, and thereby outputs (1) first vector data that is a signal whose envelope can take a smaller number of values when vector-modulated than can a signal envelope obtained by vector-modulating the third vector data and (2) second vector data that is a signal obtained by subtracting the third vector data from the first vector data, wherein:
the first signal source is a first vector modulator which vector-modulates the incoming first vector data;
the first signal is an output of the first vector modulator;
the second signal source is a second vector modulator which vector-modulates the incoming second vector data; and
the second signal is an output of the second vector modulator.

2. The transmitting circuit device according to claim 1, wherein a low pass filter is installed between the signal processor and the second vector modulator.

3. The transmitting circuit device according to claim 1, comprising an auxiliary amplifier which amplifies output of the second vector modulator, wherein:
the combiner cancels out the quantization noise components contained in the output of the first amplifier by combining the output of the first amplifier and output of the auxiliary amplifier.

4. The transmitting circuit device according to claim 3, wherein a low pass filter is installed between the signal processor and the second vector modulator or a band pass filter is installed between the second vector modulator and the auxiliary amplifier.

5. A transmitting circuit device, comprising:
a first divider which divides an incoming signal in two;
a delta sigma modulator which delta-sigma modulates a signal from the first output of the first divider;
a second divider which divides a signal from an output of the delta sigma modulator in two;
a main amplifier which amplifies a signal from the first output of the second divider;
a first combiner which combines a signal from the second output of the first divider and a signal from the second output of the second divider; and
a second combiner which combines a signal from an output of the main amplifier and a signal from an output of the first combiner,
wherein the signal at one input and the signal at the other input to the first combiner have been adjusted to be virtually equal in amplitude and opposite in phase, and
the signal at one input and the signal at the other input to the second combiner have been adjusted to be virtually equal in amplitude and opposite in phase.

6. A transmitting circuit device, comprising:
a first divider which divides an incoming signal in two;
a delta sigma modulator which delta-sigma modulates a signal from the first output of the first divider;
a second divider which divides a signal from an output of the delta sigma modulator in two;
a main amplifier which amplifies a signal from the first output of the second divider;
a first vector regulator which adjusts the amplitude and phase of a signal from the second output of the first divider;
a first combiner which combines a signal from an output of the first vector regulator and a signal from the second output of the second divider;
a second vector regulator which adjusts the amplitude and phase of a signal from an output of the first combiner;
an auxiliary amplifier which amplifies a signal from an output of the second vector regulator;
a second combiner which combines a signal from the output of the main amplifier and a signal from the output of the auxiliary amplifier,
wherein the signal at one input and the signal at the other input to the first combiner have been adjusted to be virtually equal in amplitude and opposite in phase, and
the signal at one input and the signal at the other input to the second combiner have been adjusted to be virtually equal in amplitude and opposite in phase.

7. The transmitting circuit device according to claim 6, wherein a band pass filter is installed between the first combiner and the second vector regulator or between the second vector regulator and the auxiliary amplifier.

8. The transmitting circuit device according to claim 6, wherein a digital signal is input in all or some of the first divider, the delta sigma modulator, the second divider, the first vector regulator, the second combiner, and the second vector regulator.

9. A transmitting circuit device, comprising:
a first divider which divides amplitude modulation data received from a data generator which generates the amplitude modulation data and angle modulation data, in two;
a delta sigma modulator which delta-sigma modulates a signal from the first output of the first divider;
a second divider which divides a signal from an output of the delta sigma modulator in two;
a first vector regulator which adjusts the amplitude and phase of a signal from the second output of the first divider;
a first combiner which combines a signal from the first output of the second divider and a signal from an output of the first vector regulator;

an angle modulator which angle-modulates the angle modulation data received;

a third divider which divides a signal from an output of the angle modulator in two;

a first multiplier which multiplies a signal from the second output of the second divider and a signal from the first output of the third divider;

a second multiplier which multiplies a signal from the first output of the first combiner and a signal from the second output of the third divider;

a second vector regulator which adjusts the amplitude and phase of a signal from the first output of the second multiplier; and a second combiner which combines a signal from an output of the first multiplier and a signal from an output of the second vector regulator, wherein the signal at one input and the signal at the other input to the first combiner have been adjusted to be virtually equal in amplitude and opposite in phase, and the signal at one input and the signal at the other input to the second combiner have been adjusted to be virtually equal in amplitude and opposite in phase.

10. The transmitting circuit device according to claim 9, wherein a low pass filter is connected between the first combiner and the second multiplier.

11. A transmitting circuit device, comprising:

a first divider which divides in two amplitude modulation data received from a data generator which generates the amplitude modulation data and angle modulation data;

a delta sigma modulator which delta-sigma modulates a signal from the first output of the first divider;

an angle modulator which angle-modulates the angle modulation data received;

a second divider which divides in two a signal from an output of the angle modulator;

a first multiplier which multiplies a signal from the first output of the second divider and a signal from an output of the delta sigma modulator;

a third divider which divides in two a signal from an output of the first multiplier;

a second multiplier which multiplies a signal from the second output of the second divider and a signal from the second output of the first divider;

a first vector regulator which adjusts the amplitude and phase of a signal from an output of the second multiplier;

a first combiner which combines a signal from the first output of the third divider and a signal from an output of the first vector regulator;

a second vector regulator which adjusts the amplitude and phase of a signal from an output of the first combiner;

an auxiliary amplifier which amplifies a signal from an output of the second vector modulator; and a second combiner which combines a signal from the second output of third divider and a signal from an output of the auxiliary amplifier, wherein the signal at one input and the signal at the other input to the first combiner have been adjusted to be virtually equal in amplitude and opposite in phase, and the signal at one input and the signal at the other input to the second combiner have been adjusted to be virtually equal in amplitude and opposite in phase.

12. The transmitting circuit device according to claim 11, wherein a band pass filter is installed between the first combiner and the second vector regulator or between the second vector regulator and the auxiliary amplifier.

13. A transmitting circuit device, comprising:

a delta sigma modulator which delta-sigma modulates amplitude modulation data received from a data generator which generates the amplitude modulation data and angle modulation data;

an angle modulator which angle-modulates the angle modulation data received;

a multiplier which multiplies a signal from an output of the delta sigma modulator and a signal from an output of the angle modulator;

a divider which divides an output of the multiplier;

a vector modulator which modulates an incoming vector signal;

a first vector regulator which adjusts the amplitude and phase of a signal from an output of the vector modulator;

a first combiner which combines a signal from a first output of the divider and a signal from an output of the first vector regulator;

a second vector regulator which is connected to output of the first combiner; and a second combiner which combines a signal from a second output of the divider and a signal from an output of the second vector regulator, wherein the signal at one input and the signal at the other input to the first combiner have been adjusted to be virtually equal in amplitude and opposite in phase, and the signal at one input and the signal at the other input to the second combiner have been adjusted to be virtually equal in amplitude and opposite in phase.

14. The transmitting circuit device according to claim 13, comprising an auxiliary amplifier which amplifies a signal from an output of the second vector regulator and outputs it to the second combiner, wherein a band pass filter is installed between the first combiner and the second vector regulator or between the second vector regulator and the auxiliary amplifier.

15. The transmitting circuit device according to any of claims 9 to 13, wherein amplitude modulation data is a digitalized data.

16. The transmitting circuit device according to any of claims 6, 11, or 13, wherein an auxiliary amplifier is connected to at least one of the vector regulators and a predistortion circuit is installed in a stage preceding the auxiliary amplifier.

17. The transmitting circuit device according to any of claims 6 to 14, wherein a bandpass filter is installed in a stage upstream or downstream of the second combiner.

18. The transmitting circuit device according to claim 17, wherein the bandpass filter varies its pass band with the transmit frequency.

19. A transmitting circuit device, comprising:

a delta sigma modulator which delta-sigma modulates an incoming I signal;

a first divider which divides a signal from an output of the delta sigma modulator in two;

a first vector regulator which adjusts the amplitude and phase of the incoming I signal;

a first combiner which combines a signal from the first output of the first divider and a signal from an output of the a first vector regulator;

a signal generator which generates a local oscillator signal;

a phase shifter which phase-shifts an output signal of the signal generator;

a first multiplier which multiplies a signal from an output of the first combiner and an output signal from the phase shifter;

a second vector regulator which adjusts the amplitude and phase of a signal from an output of the first multiplier;

a second multiplier which multiplies a signal from the second output of the first divider and the output signal from the phase shifter;

a second combiner which combines a signal from an output of the second vector regulator and a signal from an output of the second multiplier;

a delta sigma modulator which delta-sigma modulates an incoming Q signal;

a second divider which divides a signal from an output of the delta sigma modulator in two;

a third vector regulator which adjusts the amplitude and phase of the incoming Q signal;

a third combiner which combines a signal from the first output of the second divider and a signal from an output of the third vector regulator;

a third multiplier which multiplies a signal from an output of the third combiner and a signal from an output of the phase shifter;

a fourth vector regulator which adjusts the amplitude and phase of a signal from an output of the third multiplier;

a fourth multiplier which multiplies a signal from the second output of the second divider and the output signal from the phase shifter;

a fourth combiner which combines a signal from the first output of the fourth vector regulator and a signal from an output of the fourth multiplier; and a fifth combiner which combines a signal from an output of the second combiner and a signal from an output of the fourth combiner;

wherein the signal at one input and the signal at the other input to the first combiner have been adjusted to be virtually equal in amplitude and opposite in phase, the signal at one input and the signal at the other input to the second combiner have been adjusted to be virtually equal in amplitude and opposite in phase, the signal at one input and the signal at the other input to the third combiner have been adjusted to be virtually equal in amplitude and opposite in phase, and the signal at one input and the signal at the other input to the fourth combiner have been adjusted to be virtually equal in amplitude and opposite in phase.

20. The transmitting circuit device according to claim 19, wherein:

a low pass filter is connected between the first combiner and the first multiplier; and a low pass filter is connected between the third combiner and the third multiplier.

21. The transmitting circuit device according to claim 19, wherein a bandpass filter is connected in at least one or more places from among a stage upstream or downstream of the second combiner, a stage upstream or downstream of the fourth combiner, and a stage upstream or downstream of the fifth combiner.

22. A wireless communications device, comprising:

a transmitting circuit which outputs transmit signals; and a receive circuit which receives receive signals, wherein the transmitting circuit device according to any of claims 1, 2 to 13 and 19 to 21 is used for the transmitting circuit.

* * * * *